United States Patent
Murakami et al.

(10) Patent No.: US 10,948,633 B2
(45) Date of Patent: Mar. 16, 2021

(54) TRANSLUCENT STRUCTURE, METHOD FOR MANUFACTURING SAME, AND ARTICLE

(71) Applicant: AGC Inc., Chiyoda-ku (JP)

(72) Inventors: Takaaki Murakami, Tokyo (JP); Azusa Takai, Tokyo (JP); Toru Ikeda, Tokyo (JP); Yosuke Takeda, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 318 days.

(21) Appl. No.: 15/908,208

(22) Filed: Feb. 28, 2018

(65) Prior Publication Data
US 2018/0185875 A1     Jul. 5, 2018

Related U.S. Application Data

(63) Continuation of application No. PCT/JP2016/075474, filed on Aug. 31, 2016.

(30) Foreign Application Priority Data

Aug. 31, 2015 (JP) ................................. 2015-170874

(51) Int. Cl.
*G02B 5/02*        (2006.01)
*C03C 21/00*       (2006.01)
(Continued)

(52) U.S. Cl.
CPC ............. *G02B 5/0242* (2013.01); *B05D 1/06* (2013.01); *B32B 3/30* (2013.01);
(Continued)

(58) Field of Classification Search
CPC .......... G02B 1/11; G02B 1/111; G02B 1/115; G02B 5/0242; G02B 5/0247; G02B 5/287
See application file for complete search history.

(56) References Cited

U.S. PATENT DOCUMENTS

2011/0003121 A1   1/2011   Tsuda
2013/0271836 A1   10/2013  Fukaya et al.
(Continued)

FOREIGN PATENT DOCUMENTS

JP      2008-224718      9/2008
JP      2009-58640       3/2009
(Continued)

OTHER PUBLICATIONS

International Search Report dated Oct. 4, 2016 in PCT/JP2016/075474, filed on Aug. 31, 2016 (with English Translation).
(Continued)

*Primary Examiner* — Darryl J Collins
*Assistant Examiner* — Journey F Sumlar
(74) *Attorney, Agent, or Firm* — Oblon, McClelland, Maier & Neustadt, L.L.P.

(57)  ABSTRACT

A translucent structure includes a translucent substrate and an antireflection layer provided on a visible side of the translucent substrate so that reflectivity of the translucent structure based on an SCI method is 3% or less. A visible-side outermost surface of the translucent structure includes a concave and convex structure as follows. The concave and convex structure includes a first convex portion and a second convex portion. The first convex portion has a diameter exceeding 10 µm and 185 µm or less in a specific section, and a specific maximum height is 0.2 to 8 µm. The second convex portion has a diameter exceeding 1 µm in a specific section, the number thereof is 0.0001 to 1.2 per 1 µm$^2$, and a specific average height thereof is 0.1 to 8 µm.

20 Claims, 8 Drawing Sheets

(51) Int. Cl.
*C03C 17/25* (2006.01)
*C03C 23/00* (2006.01)
*C03C 17/42* (2006.01)
*C03C 17/34* (2006.01)
*B05D 1/06* (2006.01)
*B32B 3/30* (2006.01)
*G02B 1/115* (2015.01)
*B32B 17/10* (2006.01)
*G02B 1/111* (2015.01)
*G02B 5/28* (2006.01)

(52) U.S. Cl.
CPC ........ *B32B 17/10137* (2013.01); *C03C 17/25* (2013.01); *C03C 17/3417* (2013.01); *C03C 17/42* (2013.01); *C03C 21/002* (2013.01); *C03C 23/0075* (2013.01); *G02B 1/111* (2013.01); *G02B 1/115* (2013.01); *G02B 5/0215* (2013.01); *G02B 5/0247* (2013.01); *C03C 2217/732* (2013.01); *C03C 2217/734* (2013.01); *C03C 2217/76* (2013.01); *C03C 2217/77* (2013.01); *G02B 5/287* (2013.01)

(56) References Cited

U.S. PATENT DOCUMENTS

| | | |
|---|---|---|
| 2014/0329022 A1 | 11/2014 | Otani et al. |
| 2015/0226882 A1 | 8/2015 | Sahara et al. |
| 2017/0023705 A1 | 1/2017 | Sahara et al. |
| 2017/0139082 A1 | 5/2017 | Takai et al. |
| 2018/0001339 A1 | 1/2018 | Otani et al. |

FOREIGN PATENT DOCUMENTS

| | | |
|---|---|---|
| JP | 2009-61686 | 3/2009 |
| JP | 2013-156523 | 8/2013 |
| JP | 2013-214059 | 10/2013 |
| WO | WO 2009/144970 A1 | 12/2009 |
| WO | WO 2013/065801 A1 | 5/2013 |
| WO | WO 2014/034720 A1 | 3/2014 |
| WO | WO 2015/125929 A1 | 8/2015 |
| WO | WO 2016/021560 A1 | 2/2016 |

OTHER PUBLICATIONS

Written Opinion dated Oct. 4, 2016 in PCT/JP2016/075474, filed on Aug. 31, 2016.

TRANSLUCENT STRUCTURE, METHOD FOR MANUFACTURING SAME, AND ARTICLE

TECHNICAL FIELD

The present invention relates to a translucent structure, a method for manufacturing the same, and an article with the same.

BACKGROUND ART

In an image display device (such as a liquid crystal display, an organic EL display, a plasma display, etc.) provided in various equipment (such as a television set, a personal computer, a smartphone, a cellular phone, a vehicle, etc.), visibility is lowered by a reflected image when external light such as indoor lighting (a fluorescent lamp or the like) or sunlight is reflected in a display surface.

In order to increase visibility, it has been proposed to apply an antireflection treatment or an antiglare treatment to a display surface of an image display device. In the antireflection treatment, an antireflection layer is formed in the display surface to thereby suppress reflection of external light itself. In the antiglare treatment, concave and convex structures are formed in the display surface to diffuse and reflect external light to thereby make a reflected image unclear. Examples of methods for forming such concave and convex structures include a method in which the display surface is etched, a method in which an antiglare layer having concave and convex structures in its surface is formed on the display surface, etc. As a method for forming such an antiglare layer, there is known a method in which coating liquid containing a silica precursor such as a hydrolytic condensate of alkoxysilane or the like is applied onto a substrate by a spraying method, and fired (for example, Patent Literature 1).

Patent Literature 2 proposes an antiglare/antireflection member including a substrate in which an antiglare layer having a concave and convex structure is provided in a surface layer, and an antireflection layer which is provided on the antiglare layer. In the antiglare/antireflection member in which the antireflection layer is disposed on the antiglare layer, it is said that reflectivity in the antiglare layer can be reduced to reduce the quantity of light reflected irregularly by the antiglare layer, and a more excellent antiglare property can be obtained.

However, there is a problem that, when the antiglare treatment is applied to the display surface, reflection of external light in the display surface is indeed suppressed, but sparkle occurs in the display surface to thereby reduce the visibility of an image. There is a tendency that the sparkle is increased as the antiglare property is higher. For example, when the antiglare layer is formed by a spraying method and coating liquid are applied repeatedly, the antiglare property can be enhanced due to increase in haze, but sparkle is emphasized. The same problem occurs in the antiglare/antireflection member according to Patent Literature 2.

Patent Literature 3 suggests that a plurality of convex portions are disposed separately on a substrate in order to suppress sparkle or the like on an image. Each of the convex portions has a shape like a plateau or an approximately circular basin with at least one edge, and a part of the convex portion in tight contact with the substrate is set at a size of 50 to 250 μm.

In Patent Literature 3, however, the haze is 10% or less, and the antiglare property is not sufficient.

CITATION LIST

Patent Literature

Patent Literature 1: JP 2009-058640 A
Patent Literature 2: WO 2014/034720 A1
Patent Literature 3: JP 2013-214059 A

SUMMARY OF THE INVENTION

Technical Problems

An object of the present invention is to provide a translucent structure which is superior in antiglare property and antireflection property and in which sparkle is suppressed sufficiently, and an article provided with the translucent structure.

In addition, another object of the present invention is to provide a manufacturing method capable of manufacturing a translucent structure which is superior in antiglare property and antireflection property and in which sparkle is suppressed sufficiently.

Solution to Problems

The present invention includes the following embodiments.

(1) A translucent structure comprising a translucent substrate and an antireflection layer provided on a visible side of the translucent substrate so that reflectivity of the translucent structure based on an SCI method is 3% or less, wherein a visible-side outermost surface of the translucent structure includes a concave and convex structure as follows:

the concave and convex structure includes a first convex portion and a second convex portion, the first convex portion having a diameter (based on true circle conversion) exceeding 10 μm in a section at a height of 0.05 μm from a bearing height in a surface shape obtained by measuring a region of (101 μm×135 μm) to (111 μm×148 μm) by a laser microscope, and the second convex portion having a diameter (based on true circle conversion) exceeding 1 μm in a section at a height of 0.5 μm from the bearing height in the surface shape;

an average diameter (based on true circle conversion) of the first convex portion in the section at the height of 0.05 μm from the bearing height in the surface shape is more than 10 μm and 185 μm or less;

a maximum height of the first convex portion with reference to a height of a lowest part within the region is 0.2 to 8 μm; and the number of the second convex portion is 0.0001 to 1.2 per 1 μm$^2$, and an average height of the second convex portion with reference to the bearing height is 0.1 to 8 μm.

That is, the translucent structure includes at least an antireflection layer and includes a concave and convex structure having (A) a first convex portion and (B) a second convex position on the visible-side outermost surface, and (A) the first convex position has a diameter (based on true circle conversion) exceeding 10 μm and 185 μm or less in a section at a height of 0.05 μm from a bearing height in a surface shape obtained by measuring a region of (101 μm×135 μm) to (111 μm×148 μm) by a laser microscope, and a maximum height of the first convex portion with reference to a height of a lowest part within the region is 0.2 to 8 μm, and (B) the second convex portion has a diameter (based on true circle conversion) exceeding 1 μm in a section at a height of 0.5 μm from the bearing height in the surface shape, the number of the second convex portion is 0.0001 to 1.2 per 1 μm$^2$, and an average height of the second convex portion with reference to the bearing height is 0.1 to 8 μm.

(2) The translucent structure according to (1), wherein the antireflection layer is located on the outermost visible side of the translucent structure.

(3) The translucent structure according to (1), further comprising a water-repellent and oil-repellent layer, wherein the water-repellent and oil-repellent layer is located on the outermost visible side of the translucent structure, and the antireflection layer is located just under the water-repellent and oil-repellent layer.

(4) The translucent structure according to any one of (1) to (3), further comprising a base layer between the translucent substrate and the antireflection layer, wherein a surface of the base layer on the antireflection layer side includes the concave and convex structure.

(5) The translucent structure according to any one of (1) to (3), wherein a visible-side surface of the translucent substrate includes the concave and convex structure.

(6) The translucent structure according to any one of (1) to (5), wherein the translucent substrate is a glass sheet.

(7) The translucent structure according to any one of (1) to (6), wherein the translucent substrate has a curved surface.

(8) The translucent structure according to any one of (1) to (7), which has a haze of more than 10% and 70% or less.

(9) The translucent structure according to any one of (1) to (8), which is for use in an on-vehicle article.

(10) A method for manufacturing the translucent structure according to (4), the method comprising:

a step of applying a coating composition onto the translucent substrate to form a coating film, and firing the coating film to thereby form the base layer; and a step of forming the antireflection layer on the base layer; wherein:

the coating composition contains at least one of a silica precursor (A) and a particle (C), and a liquid medium (B), and the liquid medium (B) contains 86 mass % or more of a liquid medium (B1) relative to a total quantity of the liquid medium (B), the liquid medium (B1) having a boiling point of 150° C. or less; and the coating composition is applied by charging and spraying the coating composition by use of an electrostatic coating apparatus including an electrostatic coating gun including a rotary atomizing head.

(11) The method for manufacturing the translucent structure according to (10), wherein viscosity of the coating composition at a coating temperature is 0.003 Pa·s or less.

(12) An article comprising the translucent structure according to any one of (1) to (9).

Advantageous Effects of the Invention

A translucent structure in the present invention is superior in antiglare property and antireflection property, and sparkle is suppressed sufficiently.

According to a method for manufacturing a translucent structure in the present invention, it is possible to manufacture a translucent structure which is superior in antiglare property and antireflection property and in which sparkle is suppressed sufficiently.

A translucent structure provided in an article in the present invention is superior in antiglare property and antireflection property, and sparkle is suppressed sufficiently.

DESCRIPTION OF EMBODIMENTS

The following definitions of terms are applied to the present description and the scope of claims.

"Translucency" means that visible light can be transmitted.

"Antireflection property" means a property of reducing reflectivity. A method for measuring reflectivity may be either an SCI (including specular reflected light) method or an SCE (not including specular reflected light) method.

"Bearing height" is a value of a most dominant height z in a height distribution histogram obtained from xyz data of a surface shape in a region to be measured by a laser microscope (hereinafter also referred to as "observation region"). The observation region measures (101 μm by 135 μm) to (111 μm by 148 μm). The height z in the xyz data is a height standardized by a lowest point of the observation region (a length of a line drawn perpendicularly from a position for measuring the height z to a plane which is parallel to a main surface of the translucent structure and which includes the lowest point). The same thing will be applied to height in a surface shape even when the reference is not defined specifically. An interval (bin) in the histogram for calculating the bearing height is set at 1,000.

To "have silica as main component" means containing 90 mass % or more of $SiO_2$.

A "silica precursor" means a substance capable of forming a matrix having silica as its main component when it is fired.

A "hydrolyzable group bonded to a silicon atom" means a group which can be converted into an OH group bonded to the silicon atom by hydrolysis.

A "scaly particle" means a particle having a flat shape. The shape of the particle can be confirmed by use of a transmission electron microscope (hereinafter also referred to as "TEM").

An "average particle size" means a volume-based 50% cumulative particle size (D50) which is a particle size at a point of 50% in a cumulative volume distribution curve in which the total volume of a particle size distribution obtained on a volume basis is regarded as 100%. The particle size distribution can be obtained by a frequency distribution and a cumulative volume distribution curve measured by a laser diffraction/scattering particle size distribution measuring apparatus.

An "aspect ratio" means a ratio of a longest length to a thickness of a particle (longest length/thickness), and an "average aspect ratio" is an average value of aspect ratios of 50 particles selected at random. The thickness of the particle is measured by an atomic force microscope (hereinafter also referred to as "AFM"), and the longest length is measured by the TEM.

In the present description, a sign "to" representing a numerical range is used as a meaning including a lower limit and an upper limit designated by numerical values stipulated before and after the sign. In the present description, the sign "to" will be used in the same meaning as long as special definition is not set down.

Translucent Structure

First Embodiment

Figure 1:
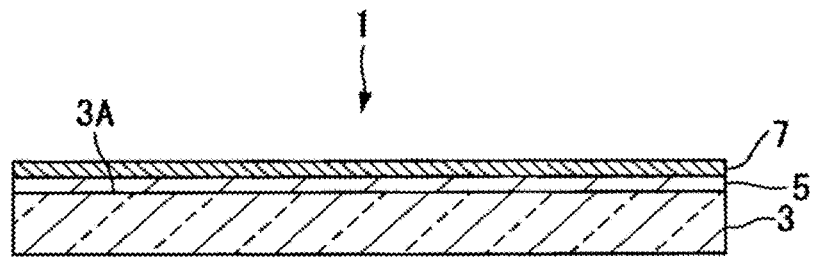
FIG. 1 is a schematic sectional view showing a first embodiment of a translucent structure in the present invention.
Figure 2:
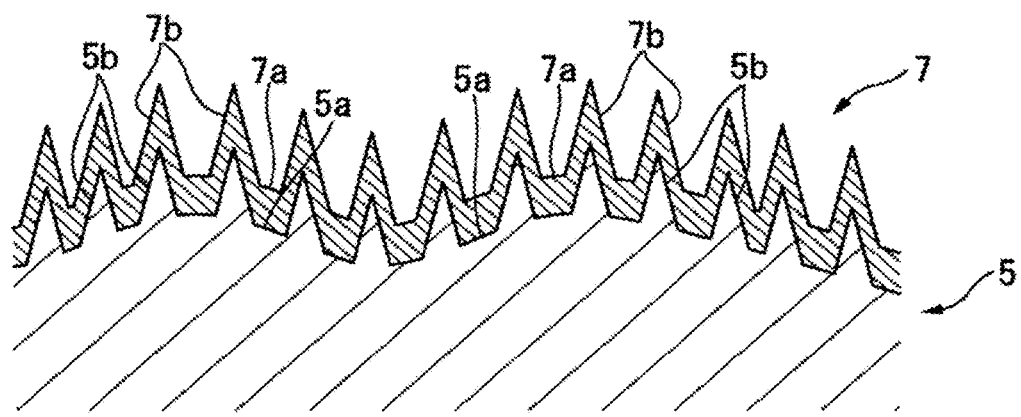
FIG. 2 is a schematic sectional view showing a surface shape of the translucent structure according to the first embodiment.

FIG. 1 is a schematic sectional view showing a first embodiment of a translucent structure in the present invention. FIG. 2 is a schematic sectional view showing a surface shape of the translucent structure according to the embodiment.

A translucent structure 1 according to the embodiment has a translucent substrate 3, a base layer 5 formed on a first surface 3A of the translucent substrate 3, and an antireflection layer (hereinafter also referred to as "AR layer") 7 formed on the base layer 5.

In the translucent substrate 3, the first surface 3A is located on a visible side. Each of the base layer 5 and the AR layer 7 has a concave and convex structure in its surface. The AR layer 7 is located on the outermost visible side of the translucent structure 1. Therefore, the surface of the AR layer 7 is the visible-side outermost surface of the translucent structure 1.

(Translucent Substrate)

A substrate which can transmit visible light may be used as the translucent substrate 3. A transparent substrate is preferred. Transparency in the translucent substrate 3 means that 80% or more of light in a wavelength range of 400 to 1,100 nm is transmitted on average (that is, average transmittance is 80% or more). The average transmittance of light in the wavelength range of 400 to 1,100 nm is measured by use of a spectrophotometer.

For example, glass, resin, etc may be used as a material of the translucent substrate 3.

For example, soda-lime glass, borosilicate glass, aluminosilicate glass, alkali-free glass, etc. may be used as the glass.

For example, polyethylene terephthalate, polycarbonate, triacetylcellulose, polymethyl methacrylate, etc. may be used as the resin.

For example, a sheet, a film, etc. may be used as a form of the translucent substrate 3.

The first surface 3A of the translucent substrate 3 may be smooth or may have a concave and convex structure. The first surface 3A is preferably smooth in consideration of usefulness of providing the base layer 5. Arithmetic average roughness Ra of the first surface 3A is preferably 10 nm or less, more preferably 5 nm or less, further more preferably 2 nm or less, and particularly preferably 1 nm or less. The arithmetic average roughness Ra herein is a value measured by an atomic force microscopic (AFM) mode of a scanning probe microscope multifunction unit SPA-400 manufactured by EKO Instruments.

The shape of the translucent substrate 3 may be not only an illustrated flat shape but a shape with a curved surface. Recently, image display devices having curved surfaces as their display surfaces have appeared in various instruments (television sets, personal computers, smartphones, car navigation systems, etc.) having image display devices. The translucent structure 1 in which the translucent substrate 3 has a shape with a curved surface is useful for such an image display device.

When the translucent substrate 3 has a curved surface, the surface of the translucent substrate 3 as a whole may be composed of the curved surface, or may be composed of a part of the curved surface and a part of a flat surface. In an example in which the surface as a whole is composed of a curved surface, the translucent substrate has, for example, an arc shape in section.

The curved surface herein is a macroscopically curved surface which can be ignored in an observation region to be observed by a laser microscope.

When the translucent substrate 3 has a curved surface, the curvature radius (hereinafter also referred to as "R") of the curved surface may be set appropriately in accordance with the usage of the translucent structure 1, the kind of the translucent substrate 3, etc. Although not limited particularly, the R is preferably 25,000 mm or less, more preferably 10 to 5,000 mm, and particularly preferably 50 to 3,000 mm. When the R is not higher than the aforementioned upper limit, design is more excellent than that of a flat sheet. When the R is not lower than the aforementioned lower limit, a base layer can be formed uniformly even on the curved surface.

A glass sheet is preferred as the translucent substrate 3.

The glass sheet may be a smooth glass sheet formed by a float process, a fusion process, a down draw process, or the like, or may be a figured glass having a concave and convex structure in its surface and formed by a roll-out process or the like. In addition, the glass sheet may be not only a glass sheet having a flat shape but a glass sheet having a shape with a curved surface. When the glass sheet has a curved surface, a preferable curvature radius of the curved surface is similar to the aforementioned curvature radius.

The thickness of the glass sheet is not limited particularly. For example, a glass sheet having a thickness of 10 mm or less may be used. As the thickness is reduced, light absorption can be suppressed to be lower. It is therefore preferable to reduce the thickness for applications aimed at improvement in transmittance. In addition, reduction in thickness contributes to reduction in weight of the translucent structure 1.

The glass sheet is preferably a strengthened glass sheet. The strengthened glass sheet is a glass sheet subjected to a strengthening treatment. Due to the strengthening treatment, the strength of the glass can be improved, for example, to reduce the sheet thickness while keeping the strength.

In the invention, however, another glass sheet than the strengthened glass sheet may be used, and set appropriately in accordance with the usage or the like of the translucent structure 1.

A treatment for forming a compressive stress layer in a surface of a glass sheet has been generally known as the strengthening treatment. The compressive stress layer in the surface of the glass sheet improves the strength of the glass sheet against damage or impact. An air-cooling strengthening method (physical strengthening method) and a chemical strengthening method are typical methods for forming a compressive stress layer in a surface of a glass sheet.

In the air-cooling strengthening method, a surface of a glass sheet heated up to the vicinity of the softening point temperature of the glass (for example, 600 to 700° C.) is quenched by air cooling or the like. Thus, a difference in temperature occurs between the surface and the inside of the glass sheet to thereby generate compressive stress in a surface layer of the glass sheet.

In the chemical strengthening method, a glass sheet is immersed in molten salt at a temperature not higher than the distortion point temperature of the glass to thereby convert ions (such as sodium ions) in a surface layer of the glass sheet into ions (such as potassium ions) having larger ion radii. Thus, compressive stress occurs in the surface layer of the glass sheet.

When the thickness of the glass sheet is thinner (for example, less than 2 mm), a difference in temperature hardly occurs between the inside and the surface layer of the glass sheet according to the air-cooling strengthening method, so that the glass sheet cannot be strengthened sufficiently. Therefore, the chemical strengthening method is preferably used.

The glass sheet to be subjected to a chemical strengthening treatment is not limited particularly as long as it has a composition capable of being chemically strengthened. Glasses having various compositions can be used. Examples of the glasses may include soda-lime glass, aluminosilicate glass, borate glass, lithium aluminosilicate glass, borosilicate glass, and various other glasses. In consideration of easiness to be chemically strengthened, it is preferable that the composition of the glass contains 56 to 75% of $SiO_2$, 1 to 20% of $Al_2O_3$, 8 to 22% of $Na_2O$, 0 to 10% of $K_2O$, 0 to 14% of MgO, 0 to 5% of $ZrO_2$, and 0 to 10% of CaO by molar percentage on an oxide basis. Of those glasses, aluminosilicate glass is preferred.

The sheet thickness of the glass sheet to be subjected to the chemical strengthening treatment is preferably 0.4 to 3 mm, and particularly preferably 0.5 to 2.5 mm. When the sheet thickness of the chemically strengthened glass sheet is not more than the upper limit of the aforementioned range, the translucent structure 1 is light in weight. When the sheet thickness is not less than the lower limit of the range, the translucent structure 1 is excellent in strength.

There is no change in sheet thickness between before and after the glass sheet is chemically strengthened. That is, the sheet thickness of the glass sheet to be subjected to the chemical strengthening treatment agrees with the sheet thickness of the chemically strengthened glass sheet (the glass sheet subjected to the chemical strengthening treatment).

The physical strengthening treatment and the chemical strengthening treatment for the glass may be performed either before or after the base layer is formed on the surface of the glass sheet.

The translucent substrate 3 may have a functional layer in a surface of a translucent substrate body.

The translucent substrate body is similar to the material described as the translucent substrate 3.

Examples of such functional layers may include an undercoat layer, an adhesion improving layer, a protective layer, etc.

The undercoat layer has a function as an alkali barrier layer or a wide-band low-refractive-index layer. A layer formed by coating the translucent substrate body with an undercoat coating composition containing a hydrolyzate (sol-gel silica) of alkoxysilane is preferred as the undercoat layer.

(Base Layer)

The base layer 5 has a concave and convex structure in its surface on the AR layer 7 side.

Figure 3:
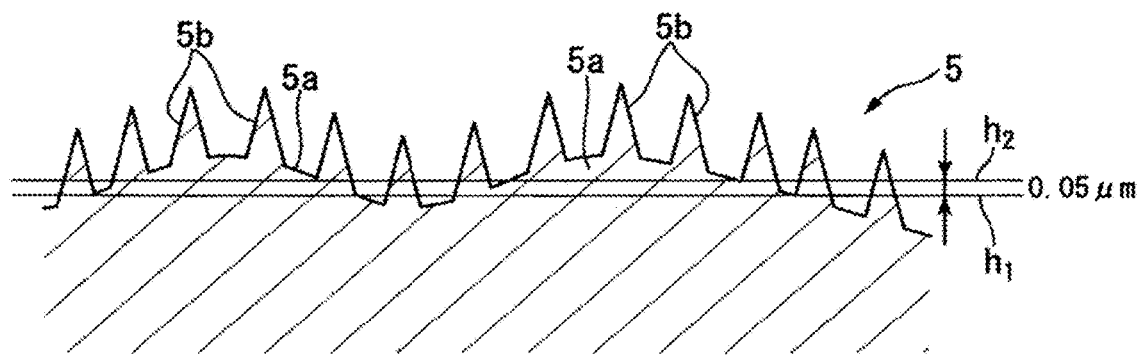
FIG. 3 is a schematic sectional view for describing a height of 0.05 μm from a bearing height in a surface shape of a base layer of the translucent structure according to the first embodiment.
Figure 4:
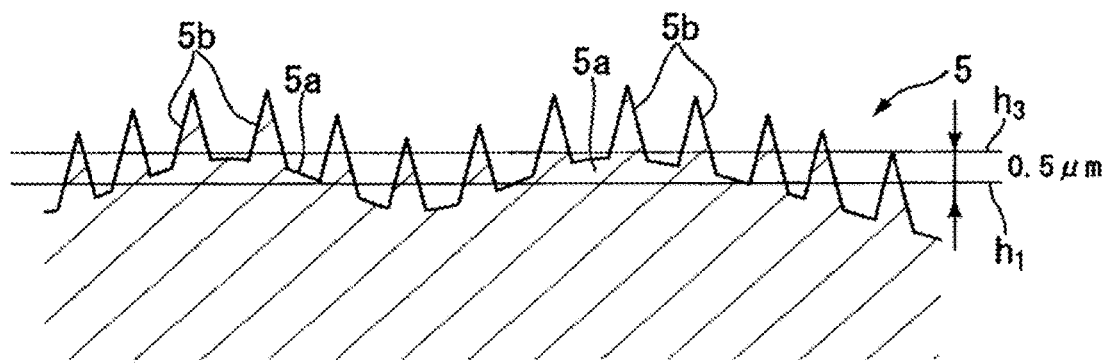
FIG. 4 is a schematic sectional view for describing a height of 0.5 μM from the bearing height in the surface shape of the base layer of the translucent structure according to the first embodiment.

FIG. 3 is a schematic sectional view for describing a height of 0.05 μm from a bearing height in the surface shape of the base layer 5. FIG. 4 is a schematic sectional view for describing a height of 0.5 μm from the bearing height in place of the height of 0.05 μm from the bearing height in FIG. 3.

The concave and convex structure in the surface of the base layer 5 includes first convex portions 5a and second convex portions 5b. The base layer 5 may have a local part where the first convex portions 5a and the second convex portions 5b are absent and the translucent substrate 3 is exposed.

Each first convex portion 5a is a convex portion in which a diameter (based on true circle conversion) of a surface shape exceeds 10 μm in a section thereof at a height $h_2$ of 0.05 μm from a bearing height $h_1$. The surface shape is obtained by measuring an observation region by a laser microscope. That is, the first convex portion 5a is a convex portion in which a cut surface is observed in a section of the surface shape at the height $h_2$ and a diameter (based on true circle conversion) calculated from the area of the cut surface exceeds 10 μm.

Each second convex portion 5b is a convex portion in which a diameter (based on true circle conversion) of the surface shape exceeds 1 (preferably more than 1 μm and 20 μm or less) in a section thereof at a height $h_3$ of 0.5 μm from the bearing height $h_1$. That is, the second convex portion $5b$ is a convex portion in which a cut surface is observed in a section of the surface shape at the height $h_3$ and a diameter (based on true circle conversion) calculated from the area of the cut surface exceeds 1 µm.

The observation region is within a range measuring (101 µm to 111 µm) by (135 µm to 148 µm). That is, the observation region measures at least 101 µm×135 µm and at most 111 µm×148 µm. The length-to-width ratio is typically set within a range of about 1.21 to 1.46.

Here, the observation region has been described because the observation region differs due to individual differences among objective lenses even when the objective lenses have one and the same magnification. A measurement result is expressed by the maximum, minimum and average values within the observation region. Therefore, a slight difference between observation regions leads to little difference between results as long as objective lenses having one and the same magnification are selected.

In the aforementioned concave and convex structure, the average diameter (based on true circle conversion) of the first convex portions $5a$ in a section of the surface shape at the height of 0.05 µm from the bearing height $h_1$ is more than 10 µm and 185 µm or less, preferably more than 10 µm and 182 µm or less, more preferably more than 10 µm and 143 µm or less, further more preferably more than 10 µm and 140 µm or less, and particularly preferably more than 20 µm and 135 µm or less. When the average diameter of the first convex portions $5a$ is within the aforementioned range, the effect of diffusing and reflecting external light is high, and the antiglare property is excellent.

In the aforementioned concave and convex structure, the maximum height of the first convex portions $5a$ is 0.2 to 8 µm, preferably 0.2 to 7 µm, more preferably 0.2 to 5 µm, further more preferably 0.7 to 5 µm, and particularly preferably 1.0 to 4 µm. When the maximum height of the first convex portion $5a$ is not less than the lower limit of the aforementioned range, the effect of diffusing and reflecting external light is higher. Generally, as the maximum height of the first convex portions $5a$ is higher within the aforementioned range, the antiglare property is more excellent.

The maximum height is a value based on a height of the lowest part within the aforementioned region. That is, the maximum height is a value obtained by the following $h_p$–$h_v$ (hereinafter also referred to as "P to V").

$h_v$: height of the lowest part within the region measured by the laser microscope $h_p$: height of a section of the surface shape cut by a plane parallel to a plane in which the inclination of laser microscope data obtained from the surface of the translucent substrate $3$ is corrected by a cubic polynomial surface fitting method, where a cut surface of the convex portion having a diameter (based on true circle conversion) exceeding 10 µm cannot be observed for the first time when the height of the section is increased, on the assumption that the section obtained at the height $h_v$ is set as a reference surface.

In the aforementioned concave and convex structure, the average diameter (based on true circle conversion) of the second convex portions $5b$ in a section of the surface shape at the height of 0.5 µm from the bearing height $h_1$ is preferably more than 1 more preferably more than 1 µm and 20 µm or less, and particularly preferably more than 1 µm and 10 µm or less. When the average diameter of the second convex portions $5b$ is within the aforementioned range, sparkle is more suppressed as the density of the second convex portions is increased.

In the aforementioned concave and convex structure, the average height of the second convex portions $5b$ is 0.1 to 8 µm, preferably 0.5 to 8 µm, more preferably 1 to 8 µm, further more preferably 1.5 to 5 µm, and particularly preferably 1.7 to 4 µm. When the average height of the second convex portions $5b$ is not less than the lower limit of the aforementioned range, the effect of suppressing sparkle is excellent. When the average height of the second convex portions $5b$ is not more than the upper limit of the aforementioned range, the base layer $5$ is excellent in durability such as wear resistance.

The average height is a value based on the bearing height $h_1$ in the surface shape. That is, the height of each of the second convex portions $5b$ within the region is measured using the bearing height $h_1$ as height of 0, and heights obtained thus are averaged as the average height.

The number of the second convex portions $5b$ in the concave and convex structure is 0.0001 to 1.2 per 1 µm$^2$, preferably 0.0004 to 1.2 per 1 µm$^2$, more preferably 0.0006 to 1.2 per 1 µm$^2$, further preferably 0.0006 to 0.5 per 1 µm$^2$, particularly preferably 0.0008 to 0.1 per 1 µm$^2$, and most preferably 0.001 to 0.05 per 1 µm$^2$. When the number of the second convex portions $5b$ (the density of the second convex portions $5b$) per 1 µm$^2$ is not less than the lower limit of the aforementioned range and not more than the upper limit of the same, sparkle can be suppressed sufficiently. As the number increases within the aforementioned range, pieces of light refracted by the first convex portions $5a$ can be inhibited from interfering with each other, so as to enhance the effect of suppressing sparkle.

The region to be measured by the laser microscope is selected at random from the surface of the translucent structure $1$ on the base layer $5$ side.

The bearing height $h_1$, the diameters (based on true circle conversion) of the cut surfaces of each convex portion in the section at the height $h_3$ of 0.05 µm from the bearing height $h_1$ and in the section at the height $h_3$ of 0.5 µm from the bearing height $h_1$, the maximum height (P to V) of the first convex portions $5a$, the average height of the second convex portions $5b$, and the number of the second convex portions $5b$ are obtained in such a manner that the data of the surface shape measured by the laser microscope are analyzed by image processing software ("SPIP" manufactured by Image Metrology A/S). The details of the analysis will be described later in Examples.

Refractive Index:

The refractive index of the base layer $5$ is preferably 1.36 to 1.46, more preferably 1.40 to 1.46, and particularly preferably 1.43 to 1.46. When the refractive index of the base layer $5$ is not more than the upper limit of the aforementioned range, the reflectivity of external light on the surface of the base layer $5$ is reduced, and the antiglare effect is more excellent. When the refractive index of the base layer $5$ is not less than the lower limit of the aforementioned range, the base layer $5$ is sufficiently high in compactness, and excellent in adhesion to the translucent substrate $3$ which is a glass sheet or the like.

The refractive index of the base layer $5$ can be adjusted by the material of a matrix of the base layer $5$, the porosity of the base layer $5$, addition of a substance having a desired refractive index into the matrix, etc. For example, the refractive index can be lowered by increasing the porosity of the base layer $5$. In addition, the refractive index of the base layer $5$ can be lowered by adding, into the matrix, a substance (solid silica particles, hollow silica particles, etc.) having a low refractive index.

The material of the base layer 5 (the first convex portions 5a, the second convex portions 5b, etc.) can be set appropriately in consideration of the refractive index and the like. When the refractive index of the base layer 5 is 1.40 to 1.46, silica, titania, etc. can be used as the material of the base layer 5.

It is preferable that the base layer 5 has silica as its main component. When the base layer 5 has silica as its main component, the refractive index (reflectivity) of the base layer 5 is apt to be low. In addition, the chemical stability or the like of the base layer 5 is also good. Further, when the material of the translucent substrate 3 is glass, the adhesion to the translucent substrate 3 is good.

When the base layer 5 has silica as its main component, the base layer 5 may be made of only the silica, or may contain a small amount of other components than the silica. Examples of the components may include ions and/or compounds such as oxides of one or a plurality of elements selected from Li, B, C, N, F, Na, Mg, Al, P, S, K, Ca, Ti, V, Cr, Mn, Fe, Co, Ni, Cu, Zn, Ga, Sr, Y, Zr, Nb, Ru, Pd, Ag, In, Sn, Hf, Ta, W, Pt, Au, Bi, and lanthanoids.

The base layer 5 may be, for example, formed out of a coating composition containing at least one of a silica precursor (A) and particles (C), and a liquid medium (B). The coating composition may contain a binder (D) other than the silica precursor (A), another additive (E), etc. if necessary.

When the coating composition contains the silica precursor (A), the matrix of the base layer 5 has, as its main component, silica derived from the silica precursor (A). The base layer 5 may be made of the particles (C). In this case, silica particles are preferred as the particles (C). In the base layer 5, the particles (C) may be dispersed in the matrix.

A method for forming the base layer 5 using the coating composition will be described in detail later.

Examples of the base layer having silica as its main component may include a base layer formed out of a coating composition containing the silica precursor (A), a base layer formed out of a coating composition containing silica particles as the particles (C), a base layer formed out of a coating composition containing the silica precursor (A) and silica particles as the particles (C), etc.

(AR Layer)

The AR layer 7 has a function of reducing reflectivity. When the translucent structure 1 includes the AR layer 7, the reflectivity is lower than in the case where the AR layer 7 is absent.

For example, the following AR layers may be used as the AR layer 7.

(1) An AR layer with a multilayer structure in which low-refractive-index layers having a comparatively low refractive index and high-refractive-index layers having a comparatively high refractive index are disposed alternately.

(2) An AR layer composed of a low-refractive-index layer which is lower in refractive index than the translucent substrate 3.

The material of the AR layer (1) is not limited particularly. Various materials may be used as long as the materials can suppress reflection of light.

The AR layer may have a configuration in which a high-refractive-index layer and a low-refractive-index layer are disposed, or may have a configuration in which two or more high-refractive-index layers and two or more low-refractive-index layers are disposed. When the AR layer includes two or more high-refractive-index layers and two or more low-refractive-index layers, it is preferable that the AR layer has a configuration in which the high-refractive-index layers and the low-refractive-index layers are disposed alternately.

Particularly in order to enhance the antireflection performance, the AR layer (1) is preferably a laminate in which a plurality of layers are disposed. For example, it is preferable that two or more and six or less layers in total are disposed in the laminate.

The materials of the high-refractive-index layers and the low-refractive-index layers are not limited particularly, but may be selected in consideration of a required degree of antireflection, productivity, etc. As the material forming the high-refractive-index layers, for example, at least one kind selected from niobium oxide ($Nb_2O_5$), titanium oxide ($TiO_2$), zirconium oxide ($ZrO_2$), silicon nitride (SiN), and tantalum oxide ($Ta_2O_5$) can be used favorably. As the material forming the low-refractive-index layers, silicon oxide ($SiO_2$) can be used favorably.

It is more preferable that the high-refractive-index layers are made of any one selected from a niobium oxide layer, a tantalum oxide layer and a titanium oxide layer, and the low-refractive-index layers is a silicon oxide layer.

In the AR layer (2), the refractive index of the low-refractive-index layer is set in accordance with the refractive index of the translucent substrate 3. For example, when the translucent substrate 3 is glass, the refractive index of the low-refractive-index layer is preferably 1.1 to 1.5, and more preferably 1.1 to 1.3.

An example of the AR layer (2) may include a silica-based porous film in which pores are provided in a matrix having silica as its main component.

An example of the silica-based porous film may include a film including hollow particles having holes inside the particles, and a matrix.

The thickness of the AR layer (2) is preferably 50 to 300 nm, and more preferably 80 to 160 nm.

Refractive indexes of layers (the low-refractive-index layers, the high-refractive-index layers, etc.) are measured by an ellipsometer, a spectrophotometer, or the like.

Thicknesses of layers (the low-refractive-index layers, the high-refractive-index layers, the AR layer, etc.) are measured by a spectrophotometer, a palpation-type film thickness meter, or the like.

In addition, the AR layer 7 has a concave and convex structure in its surface, and the concave and convex structure includes first convex portions 7a and second convex portions 7b.

The concave and convex structure in the surface of the AR layer 7 is similar to the concave and convex structure in the surface of the base layer 5, and a preferred configuration thereof is also similar.

The concave and convex structure in the surface of the base layer 5 and the concave and convex structure in the surface of the AR layer 7 may be the same or different as long as they satisfy the aforementioned requirements. For example, of the average diameters (based on true circle conversion) and the maximum heights of the first convex portions 5a and 7a, and the average heights and the numbers per 1 $\mu m^2$ of the second convex portions 5b and 7b, one or more may be different from each other.

It is preferable that the concave and convex structure in the surface of the AR layer 7 follow the concave and convex structure in the surface of the base layer 5 as shown in FIG. 2. In this case, the concave and convex structure in the surface of the AR layer 7 may have a smaller angle or a smaller difference in height than the concave and convex structure in the surface of the base layer 5. For example, the average height of the second convex portions 7b may be lower than the average height of the second convex portions 5b.

(Glossiness of Outermost Surface)

60° relative-specular glossiness in the visible-side outermost surface (the surface of the AR layer 7 in the embodiment) of the translucent structure 1 is preferably 90% or less, more preferably 70% or less, and further more preferably 50% or less. When the 60° relative-specular glossiness in the outermost surface is not more than the aforementioned upper limit, the antiglare effect can be shown sufficiently.

The "60° relative-specular glossiness" is measured without erasing reflection on the back surface (the opposite surface to the visible side) by a method stipulated in JIS Z8741:1997 (ISO2813:1994).

(Haze)

The haze of the translucent structure 1 is preferably more than 10% and 70% or less, more preferably more than 10% and 60% or less, and particularly preferably more than 10% and 50% or less. When the haze is not less than the lower limit of the aforementioned range, the antiglare property is more excellent.

The "haze" is measured by a method stipulated in JIS K7136:2000 (ISO14782: 1999).

(Reflectivity)

The reflectivity of the translucent structure 1 based on an SCI method is preferably 3% or less, more preferably 2% or less, and particularly preferably 1% or less. As the reflectivity is lower, the antireflection property is more excellent.

The reflectivity Y (%) based on the SCI method is measured by CM-2600d manufactured by Konica Minolta, Inc.

(Sparkle Index Value S)

In the translucent structure 1 which is placed on an iPhone (registered trademark) 4 manufactured by Apple Incorporated with the surface having the concave and convex structure (the surface on the AR layer 7 side) up, the sparkle index value S measured by EyeScale ISC-A manufactured by I-System Co., Ltd. is preferably less than 100, more preferably less than 80, and particularly preferably less than 60. As the sparkle index value S is smaller, sparkle is more suppressed.

<Operation and Effect>

In the translucent structure 1 described above, the AR layer 7 is provided on the visible side of the translucent substrate 3, and the concave and convex structure which includes the first convex portions 7a and the second convex portions 7b and in which the number of the second convex portions 7b is 0.0001 to 1.2 per 1 μm$^2$ is provided in the visible-side outermost surface. Accordingly, the translucent structure 1 is excellent in antiglare property and antireflection property, and sparkle is suppressed sufficiently.

It can be considered that, of the concave and convex structure in the outermost surface, the first convex portions 7a diffuse and reflect external light to thereby chiefly contribute to the antiglare property, and the second convex portions 7b chiefly contribute to the suppression of sparkle. When the concave and convex structure is constituted by only the first convex portions 7a, it is estimated that light incident on the AR layer 7 from the translucent substrate 3 side through the base layer 5 is refracted by the surfaces of the first convex portions 7a, and pieces of light refracted thus interfere with each other in the vicinities of the surfaces of the first convex portions 7a so as to cause sparkle. It is estimated that the second convex portions 7b inhibit the refracted pieces of light from interfering with each other, so as to suppress sparkle.

<Method for Manufacturing Translucent Structure>

The method for manufacturing the translucent structure 1 is, for example, a method for manufacturing a translucent structure including:

a step of applying a coating composition onto a translucent substrate 3 to form a coating film, and firing the coating film to form a base layer 5; and a step of forming an AR layer 7 on the base layer 5; wherein:

the coating composition contains at least one of a silica precursor (A) and particles (C), and a liquid medium (B), and the liquid medium (B) contains 86 mass % of a liquid medium (B1) having a boiling point of 150° C. or less relatively to a total amount of the liquid medium (B); and the coating composition is applied in such a manner that the coating composition is charged and sprayed by an electrostatic coating apparatus provided with an electrostatic coating gun with a rotary atomizing head.

An embodiment of the aforementioned manufacturing method is a manufacturing method including:

a step of preparing the coating composition (hereinafter also referred to as a coating composition preparing step);

a step of charging and spraying the coating composition by use of an electrostatic coating apparatus provided with an electrostatic coating gun having a rotary atomizing head, so as to apply the coating composition onto the translucent substrate 3 to thereby form a coating film (hereinafter also referred to as a coating step):

a step of firing the coating film to thereby form the base layer 5 (hereinafter also referred to as a firing step); and a step of forming the AR layer 7 on the base layer 5 (hereinafter also referred to as AR layer forming step).

In accordance with necessity, the manufacturing method may include a step of forming a functional layer on a surface of a translucent substrate body to thereby produce the translucent substrate 3 before the base layer 5 is formed, and may include a step of performing a well-known post-processing after the AR layer 7 is formed.

[Coating Composition Preparing Step]

The coating composition contains at least one of a silica precursor (A) and particles (C), and a liquid medium (B).

It is preferable that the average particle size of the particles (C) is 30 nm or less when the coating composition does not contain the silica precursor (A) but contains the particles (C).

In accordance with necessity, the coating composition may contain another binder (D) than the silica precursor (A), another additive (E), etc. as long as they do not spoil the effect of the invention.

(Silica Precursor (A))

Examples of the silica precursor (A) may include a silane compound (A1) having a hydrocarbon group and a hydrolyzable group bonded to a silicon atom, and a hydrolytic condensate thereof; alkoxysilane (excluding the silane compound (A1)) and a hydrolytic condensate (sol-gel silica) thereof, silazane; etc.

In the silane compound (A1), the hydrocarbon group bonded to the silicon atom may be a univalent hydrocarbon group bonded to one silicon atom, or may be a divalent hydrocarbon group bonded to two silicon atoms. Examples of such univalent hydrocarbon groups may include an alkyl group, an alkenyl group, an aryl group, etc. Examples of such divalent hydrocarbon groups may include an alkylene group, an alkenylene group, arylene group, etc.

The hydrocarbon group may contain a group in which one or more selected from —O—, —S—, —CO— and —NR'—

(where R' is a hydrogen atom or a univalent hydrocarbon group) is combined between carbon atoms.

Examples of the hydrolyzable group bonded to the silicon atom may include an alkoxy group, an acyloxy group, a ketoxime group, an alkenyloxy group, an amino group, an aminoxy group, an amide group, an isocyanate group, a halogen atom, etc. Among them, the alkoxy group, the isocyanate group, and the halogen atom (particularly a chlorine atom) are preferred in terms of balance between stability and easiness of hydrolysis in the silane compound (A1).

As the alkoxy group, an alkoxy group having 1 to 3 carbon atoms is preferable, and a methoxy group or an ethoxy group is more preferable.

When there are a plurality of hydrolyzable groups in the silane compound (A1), the hydrolyzable groups may belong to one and the same kind of group or belong to different kinds of groups. In terms of availability, it is preferable that the hydrolyzable groups belong to one and the same kind of group.

Examples of the silane compound (A1) may include a compound expressed by the following Formula (I), alkoxysilane having an alkyl group (methyltrimethoxysilane, ethyltriethoxysilane, etc.), alkoxysilane having a vinyl group (vinyl trimethoxysilane, vinyl triethoxysilane, etc.), alkoxysilane having an epoxy group (2-(3,4-epoxycyclohexylmethy) ethyltrimethoxysilane, 3-glycidoxypropyltrimethoxysilane, 3-glycidoxypropylmethyldiethoxysilane, 3-glycidoxypropyltriethoxy silane, etc.), alkoxysilane having an acryloyloxy group (3-acryloyloxypropyltrimethoxysilane, etc.), etc.

As the silane compound (A1), the compound expressed by the following formula (I) is preferred since the base layer 5 is hardly cracked or peeled off even when the film thickness thereof is thick.

$R_{3-p}L_p\text{Si-Q-SiL}_pR_{3-p}$  (I)

In the formula (I), Q is a divalent hydrocarbon group (which may contain a group in which one or more selected from —O—, —S—, —CO— and —NR— (where R' is a hydrogen atom or a univalent hydrocarbon group) is combined between carbon atoms). The aforementioned groups can be used as the divalent hydrocarbon group.

As the divalent hydrocarbon group Q, an alkylene group having 2 to 8 carbon atoms is preferable and an alkylene group having 2 to 6 carbon atoms is more preferable since it is available and the base layer 5 is hardly cracked or peeled off even when the film thickness thereof is thick.

In the formula (I), L is a hydrolyzable group. The aforementioned ones can be used as the hydrolyzable group, and its preferred form is also the same.

R is a hydrogen atom or an univalent hydrocarbon group. The aforementioned ones can be used as the univalent hydrocarbon group.

p is an integer of 1 to 3. p is preferably 2 or 3, and particularly preferably 3 since the rate of reaction is not too slow.

Examples of alkoxysilane (excluding the silane compound (A1)) may include tetraalkoxysilane (tetramethoxysilane, tetraethoxysilane, tetrapropoxysilane, tetrabutoxysilane, etc.), alkoxysilane having a perfluoropolyether group (perfluoropolyethertriethoxysilane, etc.), alkoxysilane having a perfluoroalkyl group (perfluoroethyl triethoxysilane, etc.), etc.

Hydrolysis and condensation of the silane compound (A1) and the alkoxysilane (excluding the silane compound (A1)) can be performed by a well-known method.

For example, hydrolysis and condensation of tetraalkoxysilane are performed using water four times as much as tetraalkoxysilane by molar amount, and acid or alkali as a catalyst.

Examples of the acid may include inorganic acid ($HNO_3$, $H_2SO_4$, HCl, etc.), organic acid (formic acid, oxalic acid, monochloroacetic acid, dichloroacetic acid, trichloroacetic acid, etc.). Examples of the alkali may include ammonia, sodium hydroxide, potassium hydroxide, etc. Acid is preferred as the catalyst in terms of long-term preservation of the hydrolytic condensate of the silane compound (A).

As the silica precursor (A), one kind may be used alone, or two or more kinds may be used in combination.

In order to prevent the base layer 5 from being cracked or peeled off, it is preferable that the silica precursor (A) contains one or both of the silane compound (A1) and the hydrolytic condensate thereof.

From the viewpoint of the wear resistance of the base layer 5, it is preferable that the silica precursor (A) contains one or both of tetraalkoxysilane and a hydrolytic condensate thereof.

Particularly it is preferable that the silica precursor (A) contains one or both of the silane compound (A1) and the hydrolytic condensate thereof, and one or both of tetraalkoxysilane and the hydrolytic condensate thereof.

(Liquid Medium (B))

The liquid medium (B) is to dissolve or disperse the silica precursor (A) when the coating composition contains the silica precursor (A), and to disperse the particles (C) when the coating composition contains the particles (C). When the coating composition contains both the silica precursor (A) and the particles (C), the liquid medium (B) may have both the function as a solvent or a dispersion medium for dissolving or dispersing the silica precursor (A) and the function as a dispersion medium for dispersing the particles (C).

The liquid medium (B) contains at least the liquid medium (B1) having a boiling point of 150° C. or less. The boiling point of the liquid medium (B1) is preferably 50 to 145° C., and more preferably 55 to 140° C.

When the boiling point of the liquid medium (B1) is 150° C. or less, favorable antiglare performance can be obtained in a film obtained by applying the coating composition onto the translucent substrate 3 by use of an electrostatic coating apparatus provided with an electrostatic coating gun with a rotary atomizing head and firing the applied coating composition. When the boiling point of the liquid medium (B1) is not less than the lower limit of the aforementioned range, a concave and convex structure can be formed while satisfactorily keeping the shapes of droplets of the coating composition which have been attached onto the translucent substrate 3.

Examples of the liquid medium (B1) may include water, alcohols (methanol, ethanol, isopropyl alcohol, n-butyl alcohol, isobutyl alcohol, 1-pentanol, etc.), ketones (acetone, methyl ethyl ketone, methyl isobutyl ketone, etc.), ethers (tetrahydrofuran, 1,4-dioxane, etc.), cellosolves (methyl cellosolve, ethyl cellosolve, etc.), esters (methyl acetate, ethyl acetate, etc.), glycol ethers (ethylene glycol monomethyl ether, ethylene glycol monoethyl ether, etc.), etc.

As the liquid medium (B1), one kind may be used alone, or two or more kinds may be used in combination.

In accordance with necessity, the liquid medium (B) may further contain another liquid medium than the liquid medium (B1), that is, a liquid medium having a boiling point of higher than 150° C.

Examples of the other liquid medium may include alcohols, ketones, ethers, cellosolves, esters, glycol ethers, nitrogen containing compounds, sulfur containing compounds, etc.

Examples of alcoholes may include diacetone alcohol, 1-hexanol, ethylene glycol, etc.

Examples of nitrogen containing compounds may include N,N-dimethyl acetamide, N,N-dimethyl formamide, N-methyl pyrrolidone, etc.

Examples of glycol ethers may include ethylene glycol monobutyl ether, etc.

Examples of sulfur containing compounds may include dimethyl sulfoxide, etc.

As the other liquid medium, one kind may be used alone, or two or more kinds may be used in combination.

Since water is required for hydrolysis of alkoxysilane or the like in the silica precursor (A), the liquid medium (B) contains at least water as the liquid medium (B1) as long as the liquid medium is not replaced after the hydrolysis.

In this case, the liquid medium (B) may be only the water, or may be a liquid mixture of the water and another liquid. The other liquid may be the liquid medium (B1) other than the water or may be another liquid medium, such as alcohols, ketones, ethers, cellosolves, esters, glycol ethers, nitrogen containing compounds, sulfur containing compounds, etc. Among them, alcohols are preferred as a solvent of the silica precursor (A). Particularly, methanol, ethanol, isopropyl alcohol, and butanol are preferred.

(Particles (C))

The particles (C) composes a base layer by itself or together with a matrix derived from the silica precursor (A).

When the coating composition does not contain the silica precursor (A) but contains the particles (C), it is preferable that the average particle size of the particles (C) is 30 nm or less.

Scaly particles (C1), other particles (C2) than the scaly particles (C1), etc. can be used as the particles (C).

Scaly Particles (C1):

The average aspect ratio of the scaly particles (C1) is preferably 50 to 650, more preferably 100 to 350, and further more preferably 170 to 240. When the average aspect ratio of the scaly particles (C1) is 50 or more, the base layer can be suppressed sufficiently from being cracked or peeled off even if the base layer has a large film thickness. When the average aspect ratio of the scaly particles (C1) is 650 or less, dispersion stability in the coating composition is good.

The average particle size of the scaly particles (C1) is preferably 0.08 to 0.42 μm, and more preferably 0.17 to 0.21 μm. When the average particle size of the scaly particles (C1) is 0.08 μm or more, the base layer can be suppressed sufficiently from being cracked or peeled off even if the base layer has a large film thickness. When the average particle size of the scaly particles (C1) is 0.42 μm or less, dispersion stability in the coating composition is good.

Examples of the scaly particles (C1) may include scaly silica particles, scaly alumina particles, scaly titania, scaly zirconia, etc. Scaly silica particles are preferred because increase in refractive index of the film can be suppressed and the reflectivity can be lowered.

Scaly silica particles are flaky silica primary particles or silica secondary particles formed out of a plurality of sheets of flaky silica primary particles orientated and superposed on each other with their surfaces in parallel with one another. Each silica secondary particle generally has a particle form of a laminate structure.

The scaly silica particles may include only one of the silica primary particles and the silica secondary particles, or may include both of them.

The thickness of the silica primary particles is preferably 0.001 to 0.1 μm. When the thickness of the silica primary particles is within the aforementioned range, the silica primary particles can form scaly silica secondary particles in which the silica primary particles are orientated with their surfaces in parallel with one another to form one sheet or a plurality of sheets superposed on one another.

The ratio of the minimum length to the thickness (minimum length/thickness) in the silica primary particles is preferably 2 or more, more preferably 5 or more, and further more preferably 10 or more.

The thickness of the silica secondary particles is preferably 0.001 to 3 μm, and more preferably 0.005 to 2 μm.

The ratio of the minimum length to the thickness (minimum length/thickness) in the silica secondary particles is preferably 2 or more, more preferably 5 or more, and further more preferably 10 or more.

It is preferable that the silica secondary particles are not fused to one another but exist independently of one another.

The $SiO_2$ purity of the scaly silica particles is preferably 95 mass % or more, and more preferably 99 mass % or more.

Powder which is an aggregate of a plurality of scaly silica particles or a dispersion in which the power is dispersed in a liquid medium is used for preparing the coating composition. The silica concentration in the dispersion is preferably 1 to 80 mass %.

The power or the dispersion may contain not only scaly silica particles but also amorphous silica particles generated when the scaly silica particles are manufactured. The scaly silica particles are, for example, obtained by cracking and dispersing silica tertiary particles (hereinafter also referred to as silica aggregate) having an aggregate shape in which scaly silica particles are aggregated and superposed irregularly to form spaces among the scaly silica particles. In the amorphous silica particles, the silica aggregate has been pulverized to some extent but has not been pulverized into individual scaly silica particles yet. Thus, each amorphous silica particle has a shape in which a plurality of scaly silica particles form a block. When the powder or the dispersion contains such amorphous silica particles, there is a fear that the compactness of a formed base layer may be lowered to be easily cracked or peeled off. It is therefore preferable that the content of the amorphous silica particles in the power or the dispersion is smaller.

Each of the amorphous silica particles and the silica aggregate are observed to be black in TEM observation. On the other hand, the scaly silica primary particles or the silica secondary particles are observed to be transparent or semi-transparent in TEM observation.

Commercially available products may be used as the scaly silica particles, or the scaly silica particles may be manufactured.

It is preferable that particles manufactured by a manufacturing method stipulated in JP 2014-94845 A are used as the scaly silica particles. The manufacturing method includes a step of performing acid treatment with pH 2 or less on silica powder including silica aggregates in which scaly silica particles are aggregated, a step of performing alkali treatment with pH 8 or more on the silica power subjected to the acid treatment, so as to peptize the silica aggregates, and a step of wet-cracking the silica powder subjected to the alkali treatment, so as to obtain scaly silica particles. According to the manufacturing method, occurrence of amorphous silica particles in the manufacturing process can be suppressed to obtain power or dispersion with a small content of amorphous silica particles, in comparison with a well-known manufacturing method (for example, a method stipulated in Japanese Patent No. 4063464).

Particles (C2):

Examples of the other particles (C2) than the scaly particles (C1) may include metal oxide particles, metal particles, pigment-based particles, resin particles, etc.

Examples of materials of the metal oxide particles may include $Al_2O_3$, $SiO_2$, $SnO_2$, $TiO_2$, $ZrO_2$, ZnO, $CeO_2$, Sb-containing $SnO_x$(ATO), Sn-containing $In_2O_3$(ITO), $RuO_2$, etc. A matrix used preferably in the base layer 5 is silica. When the matrix is silica, $SiO_2$ is preferred as the material of the metal oxide particles because it has the same refractive index as the matrix.

Examples of materials of the metal particles may include metals (Ag, Ru, etc.), alloys (AgPd, RuAu, etc.), etc.

Examples of materials of the pigment-based particles may include inorganic pigments (titanium black, carbon black, etc.), and organic pigments.

Examples of materials of the resin particles may include acrylic resin, polystyrene, melanin resin, etc.

Examples of shapes of the particles (C2) may include spherical shapes, elliptic shapes, needle-like shapes, plate-like shapes, rod-like shapes, conical shapes, columnar shapes, cubic shapes, parallelepiped shapes, diamond shapes, star-like shapes, amorphous shapes, or combinations of those shapes. The other particles may exist independently of one another, or may be coupled with one another like a chain, or may be aggregated with one another.

The particles (C2) may be solid particles, or may be hollow particles, or may be perforated particles such as porous particles.

Silica particles (excluding scaly silica particles) such as spherical silica particles, rod-like silica particles or needle-like silica particles are preferred as the particles (C2). Among them, the spherical silica particles are preferable, and the porous spherical silica particles are more preferable, because the haze of the translucent structure 1 can be increased sufficiently, and the 60° relative-specular glossiness in the surface of the base layer 5 can be lowered sufficiently, with the result that the antiglare effect can be shown sufficiently.

The average particle size of the particles (C2) is preferably 0.3 to 2 μm and more preferably 0.5 to 1.5 μm. When the average particle size of the particles (C2) is 0.3 μm or more, the antiglare effect can be shown sufficiently. When the average particle size of the particles (C2) is 2 μm or less, the dispersion stability in the coating composition is good.

The BET specific surface area of the porous spherical silica particles is preferably 200 to 300 $m^2/g$.

The pore volume of the porous spherical silica particles is preferably 0.5 to 1.5 $cm^3/g$.

LIGHTSTAR (registered trademark) series manufactured by Nissan Chemical Industries, Ltd. are commercially available as the porous spherical silica particles.

As the particles (C), one kind may be used alone, or two or more kinds may be used together.

The particles (C) preferably contains the scaly particles (C1), and may further contain the particles (C2). When the particles (C) contains the scaly particles (C1), the haze of the base layer 5 is enhanced so that more excellent antiglare performance can be obtained. In addition, when the particles (C) contains the scaly particles (C1), the base layer 5 is hardly cracked or peeled off even when the film thickness of the base layer 5 is increased, in comparison with the particles (C2).

(Binder (D))

Inorganic products, resins, etc. which can be dissolved or dispersed in the liquid medium (B) can be used as the binder (D) (excluding the silica precursor (A)).

Metal oxide precursors (metals: titanium, zirconium, etc.) other than silica can be used as the inorganic products.

Thermoplastic resins, thermosetting resins, ultraviolet curing resins, etc. can be used as the resins.

(Additive (E))

Examples of the additive (E) may include an organic compound with a polar group (E1), an ultraviolet absorbing agent, an infrared reflecting agent, an infrared absorbing agent, an antireflection agent, a surface active agent for improving a leveling property, a metal compound for improving durability, etc.

When the coating composition contains the particles (C), the organic compound (E1) having a polar group may be added to the coating composition so that aggregation of the particles (C) due to electrostatic force in the coating composition can be suppressed.

In terms of the effect of suppressing the aggregation of the particles (C), an organic compound having a hydroxide group and/or a carbonyl group in a molecule is preferable as the organic compound (E1) with a polar group. An organic compound having at least one kind selected from a group consisting of a hydroxide group, an aldehyde group (—CHO), a ketone group (—C(=O)—), an ester bond (—C(=O)O—), and a carboxy group (—COOH) is more preferable. An organic compound having at least one kind selected from a group consisting of a carboxy group, a hydroxide group, an aldehyde group, and a ketone group is further more preferable.

Examples of the organic compound (E1) with a polar group may include an unsaturated carboxylic acid polymer, a cellulose derivative, an organic acid (excluding the unsaturated carboxylic acid polymer), a terpene compound, etc. As the organic compound (E1), one kind may be used alone, or two or more kinds may be used together.

Polyacrylic acid can be used as the unsaturated carboxylic acid polymer.

Polyhydroxyalkyl cellulose can be used as the cellulose derivative.

Formic acid, oxalic acid, monochloroacetic acid, dichloroacetic acid, trichloroacetic acid, citric acid, tartaric acid, maleic acid, etc. can be used as the organic acid (excluding the unsaturated carboxylic acid polymer).

When organic acid is used as a catalyst for hydrolysis of alkoxysilane or the like, the organic acid is included as the organic acid as the organic compound (E1).

Terpene means hydrocarbon having a composition of $(C_5H_8)_n$ (where n is an integer of 1 or more) containing isoprene ($C_5H_8$) as constituent unit. The terpene compound means terpenes each having a functional group derived from terpene. Terpene compounds different in unsaturation are also included in the terpene compound.

Some terpene compounds have a function as a liquid medium. However, it is assumed that "hydrocarbon having a composition of $(C_5H_8)_n$ containing isoprene as constituent unit" does not correspond to the liquid medium but corresponds to the terpene derivative.

Examples of terpene derivatives may include terpene alcohol (α-terpineol, terpinene-4-ol, L-menthol, (±)citronellol, myrtenol, borneol, nerol, farnesol, phytol, etc.), terpene aldehyde (citral, β-cyclocitral, perillaldehyde, etc.), terpene ketone ((±)camphor, β-ionone, etc.), terpene carboxylic acid (citronellic acid, abietic acid, etc.), terpene ester (terpinyl acetate, menthyl acetate, etc.), etc.

A silicone-oil-based one, an acrylic-based one can be used as the surface active agent for improving the leveling property.

A zirconium chelate compound, a titanium chelate compound, an aluminum chelate compound, etc. can be used preferably as the metal compound for improving durability. Examples of the zirconium chelate compound may include zirconium tetraacetylacetonate, zirconium tributoxystearate, etc.

(Composition)

When the coating composition contains the silica precursor (A) and the particles (C), the total content of the silica precursor (A) and the particles (C) in the coating composition is preferably 30 to 100 mass %, and more preferably 40 to 100 mass % relative to the solid content (100 mass %) of the coating composition (providing that the content of the silica precursor (A) is expressed in terms of $SiO_2$). When the total content of the silica precursor (A) and the particles (C) is not less than the lower limit of the aforementioned range, the base layer 5 is excellent in adhesion to the translucent substrate 3. When the total content of the silica precursor (A) and the particles (C) is not more than the upper limit of the aforementioned range, the base layer 5 can be suppressed from being cracked or peeled off.

When the coating composition contains the silica precursor (A), the content of the silica precursor (A) in the coating composition is preferably 35 to 95 mass % and more preferably 50 to 90 mass % relative to the solid content (100 mass %) of the coating composition (providing that the content of the silica precursor (A) is expressed in terms of $SiO_2$). When the content of the silica precursor (A) is not less than the lower limit of the aforementioned range, the base layer 5 can obtain sufficient adhesion strength to the translucent substrate 3. When the content of the silica precursor (A) is not more than the upper limit of the aforementioned range, the base layer 5 can be sufficiently suppressed from being cracked or peeled off even when the base layer 5 has a large film thickness.

When the coating composition contains the silica precursor (A) and the silica precursor (A) contains one or both of the silane compound (A1) and its hydrolytic condensate, the ratio of the silane compound (A1) and its hydrolytic condensate in the silica precursor (A) is preferably 5 to 100 mass % relative to the solid content (100 mass %) of the silica precursor (A) expressed in terms of $SiO_2$. When the ratio of the silane compound (A1) and its hydrolytic condensate is not less than the lower limit of the aforementioned range, the base layer 5 can be sufficiently suppressed from being cracked or peeled off even when the base layer 5 has a large film thickness.

When the coating composition contains the silica precursor (A) and the silica precursor (A) contains one or both of tetraalkoxysilane and its hydrolytic condensate, the ratio of one or both of tetraalkoxysilane and its hydrolytic condensate in the silica precursor (A) is preferably 60 to 100 mass % relative to the solid content (100 mass %) of the silica precursor (A) expressed in terms of $SiO_2$. When the ratio of one or both of tetraalkoxysilane and its hydrolytic condensate is not less than the lower limit of the aforementioned range, the wear resistance of the base layer 5 is more excellent.

When the silica precursor (A) contains one or both of the silane compound (A1) and its hydrolytic condensate and one or both of tetraalkoxysilane and its hydrolytic condensate, the ratio of one or both of the silane compound (A1) and its hydrolytic condensate is preferably more than 0 mass % and 50 mass % or less (more preferably more than 0 mass % and 30 mass % or less) relative to the solid content (100 mass %) of the silica precursor (A) expressed in terms of $SiO_2$, and the ratio of one or both of tetraalkoxysilane and its hydrolytic condensate is preferably 50 mass % or more and less than 100 mass % (more preferably 70 mass % or more and less than 100 mass %) likewise.

The content of the liquid medium (B) in the coating composition is set as a quantity corresponding to the solid content concentration of the coating composition.

The solid content concentration of the coating composition is preferably 1 to 8 mass % and more preferably 2 to 6 mass % relative to the total quantity (100 mass %) of the coating composition. When the solid content concentration is not less than the lower limit of the aforementioned range, the liquid quantity of the coating composition can be reduced. When the solid content concentration is not more than the upper limit of the aforementioned range, uniformity in film thickness of the base layer 5 is improved.

The solid content concentration of the coating composition is a total of the contents of all the components other than the liquid medium (B) in the coating composition. The content of the silica precursor (A) is expressed in terms of $SiO_2$.

The content of the liquid medium (B1) having a boiling point of 150° C. or less in the coating composition is 86 mass % or more relative to the total quantity of the liquid medium (B). When 86 mass % or more of the liquid medium (B1) is contained, the base layer 5 having a surface shape showing a more favorable antiglare effect is formed by applying the coating composition onto the translucent substrate by use of an electrostatic coating apparatus having an electrostatic coating gun with a rotary atomizing head, and firing the applied coating composition. When the ratio of the liquid medium (B1) is less than 86 mass %, the base layer is smoothened before the solvent is volatilized and dried, so that the concave and convex structure cannot be formed. Thus, there is a fear that the aforementioned surface shape cannot be formed in the surface of the fired film.

The content of the liquid medium (B1) is preferably 90 mass % or more relative to the total quantity of the liquid medium (B). The content of the liquid medium (B1) may be 100 mass % relative to the total quantity of the liquid medium (B).

When the coating composition contains the particles (C), the content of the particles (C) is preferably 3 to 40 mass % and more preferably 5 to 30 mass % relative to the solid content (100 mass %) of the coating composition (providing that the content of the silica precursor (A) is expressed in terms of $SiO_2$). When the content of the particles (C) is not less than the lower limit of the aforementioned range, the haze of the translucent structure is increased sufficiently, and the 60° relative-specular glossiness in the surface of the base layer 5, that is, the 60° relative-specular glossiness in the visible-side outermost surface of the translucent structure is sufficiently lowered. Accordingly, the antiglare effect can be shown sufficiently. When the content of the particles (C) is not more than the upper limit of the aforementioned range, sufficient wear resistance can be obtained.

When the coating composition contains the particles (C) and the particles (C) contain the scaly particles (C1), the content of the scaly particles (C1) is preferably 20 mass % or more and more preferably 30 mass % or more relative to the total quantity (100 mass %) of the particles (C). The upper limit is not specified particularly, but the content of the scaly particles (C1) may be 100 mass %. When the ratio of the scaly particles (C1) is not less than the aforementioned lower limit, the antiglare effect is more excellent. In addition, the base layer 5 can be sufficiently suppressed from being cracked or peeled off even when the base layer 5 has a large film thickness.
(Viscosity)

Viscosity of the coating composition at a coating temperature (hereinafter also referred to as "liquid viscosity") is preferably 0.003 Pa·s or less (3 mPa·s or less), and particularly preferably 0.001 to 0.003 Pa·s. When the liquid viscosity is not more than the aforementioned upper limit, droplets formed when the coating composition is sprayed are finer, and the base layer 5 with a desired surface shape is formed easily. When the liquid viscosity is not less than the aforementioned lower limit, the surface concave-convex shape of the base layer 5 is uniform.

The viscosity of the coating composition is a value measured by a B-type viscometer.
(Preparation Method)

For example, a solution in which the silane precursor (A) has been dissolved in the liquid medium (B) is prepared, and an additional dispersion of the liquid medium (B) and the particles (C) or the like is mixed thereto if necessary. Thus, the coating composition can be prepared.

When the particles (C) contain the scaly particles (C1) and the silica precursor (A) contains a hydrolytic condensate of tetraalkoxysilane, it is preferable that a solution of tetraalkoxysilane or a solution of a mixture of tetraalkoxysilane and its hydrolytic condensate is mixed to a dispersion of the scaly particles (C1), and tetraalkoxysilane is then hydrolyzed under the existence of the scaly particles (C1) to be thereby condensed. In this manner, the base layer 5 having desired performance can be manufactured at a high level and at high reproducibility.

[Coating Step]

The coating composition is applied onto the translucent substrate 3 in such a manner that the coating composition is charged and sprayed by use of an electrostatic coating apparatus having an electrostatic coating gun with a rotary atomizing head. Thus, a coating film of the coating composition is formed on the translucent substrate 3.
(Electrostatic Coating Apparatus)

Figure 5:
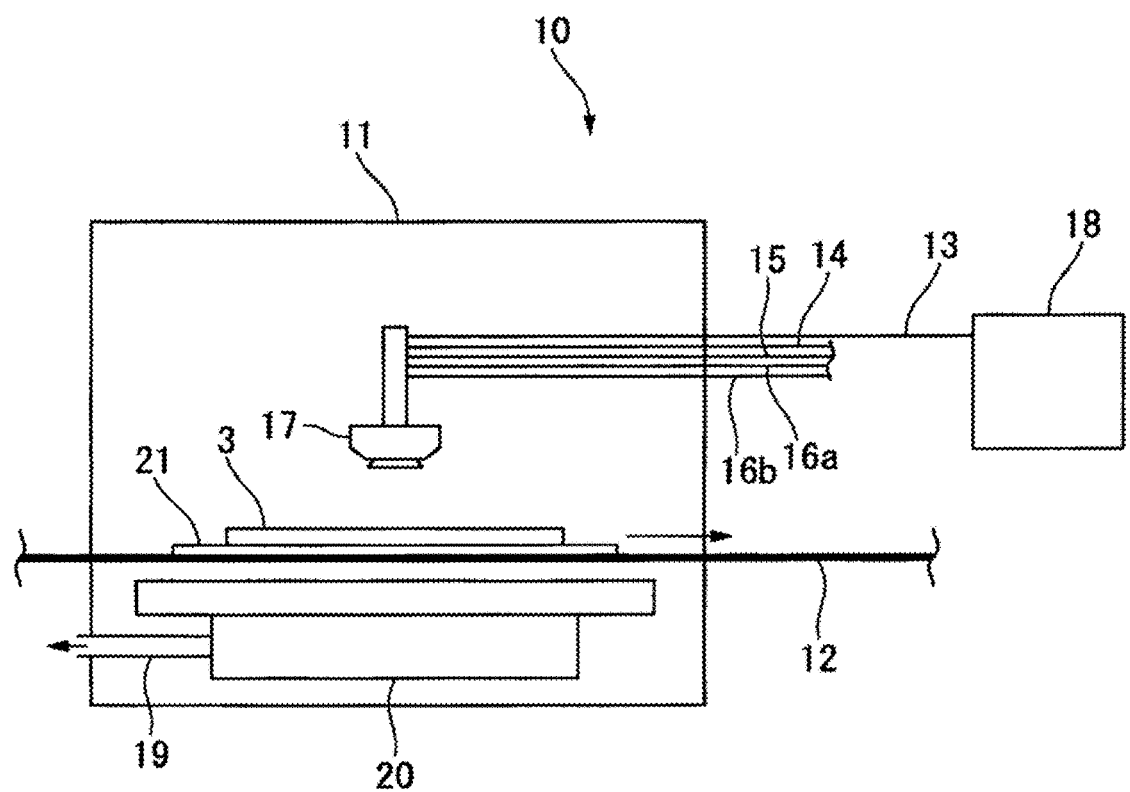
FIG. 5 is a schematic view showing an example of an electrostatic coating apparatus.

FIG. 5 is a schematic view showing an example of the electrostatic coating apparatus.

An electrostatic coating apparatus 10 has a coating booth 11, a chain conveyor 12, a plurality of electrostatic coating guns 17, a high voltage generating device 18, and an exhaust box 20.

The chain conveyor 12 penetrates the coating booth 11, and conveys an electrically conductive substrate 21 and the translucent substrate 3 placed thereon, in a predetermined direction.

In the coating booth 11 above the chain conveyor 12, the electrostatic coating guns 17 are disposed side by side in a direction crossing the conveyance direction of the translucent substrate 3. A high voltage cable 13, a supply line 14 for supplying the coating composition, a recovery line 15 for recovering the coating composition, and two supply lines 16a and 16b for supplying the air are connected to each electrostatic coating gun 17.

The high voltage generating device 18 is connected to the electrostatic coating guns 17 through the high voltage cables 13, and grounded.

The exhaust box 20 is disposed under the electrostatic coating guns 17 and the chain conveyor 12, and an exhaust duct 19 is connected to the exhaust box 20.

The electrostatic coating guns 17 are fixed to a nozzle set frame (not shown). A distance between the nozzle front end of each electrostatic coating gun 17 and the translucent substrate 3, an angle of each electrostatic coating gun 17 with respect to the translucent substrate 3, the direction in which the electrostatic coating guns 17 are arranged with respect to the conveyance direction of the translucent substrate 3, etc can be adjusted by the nozzle set frame.

High voltage is applied to the nozzle front end portion of each electrostatic coating gun 17, the supply line 14 for supplying the coating composition, and the recovery line 15. Thus, a connection part where the electrostatic coating gun 17, the supply line 14 and the recovery line 15 are connected to parts made of metal (for example, a metal part of the nozzle set frame, a metal part of a side wall penetration part of the coating booth 11, etc.) is subjected to insulating treatment with resin or the like.

The chain conveyor 12 consists of a plurality of plastic chains. Parts of the plastic chains are electrically conductive plastic chains. The electrically conductive plastic chains are grounded through metal chains (not shown), to which the plastic chains are fitted, and a grounding cable (not shown) of a drive motor for the metal chains.

The electrically conductive substrate 21 is used to sufficiently ground the translucent substrate 3 placed thereon through the electrically conductive plastic chains of the chain conveyor 12, the metal chains, and the grounding cable of the drive motor. When the translucent substrate 3 is sufficiently grounded, the coating composition is attached onto the translucent substrate 3 uniformly.

As the electrically conductive substrate 21, a metal mesh tray is preferred because a temperature drop of the translucent substrate 3 can be suppressed and the temperature distribution can be made uniform.
(Electrostatic Coating Gun)

Figure 6:
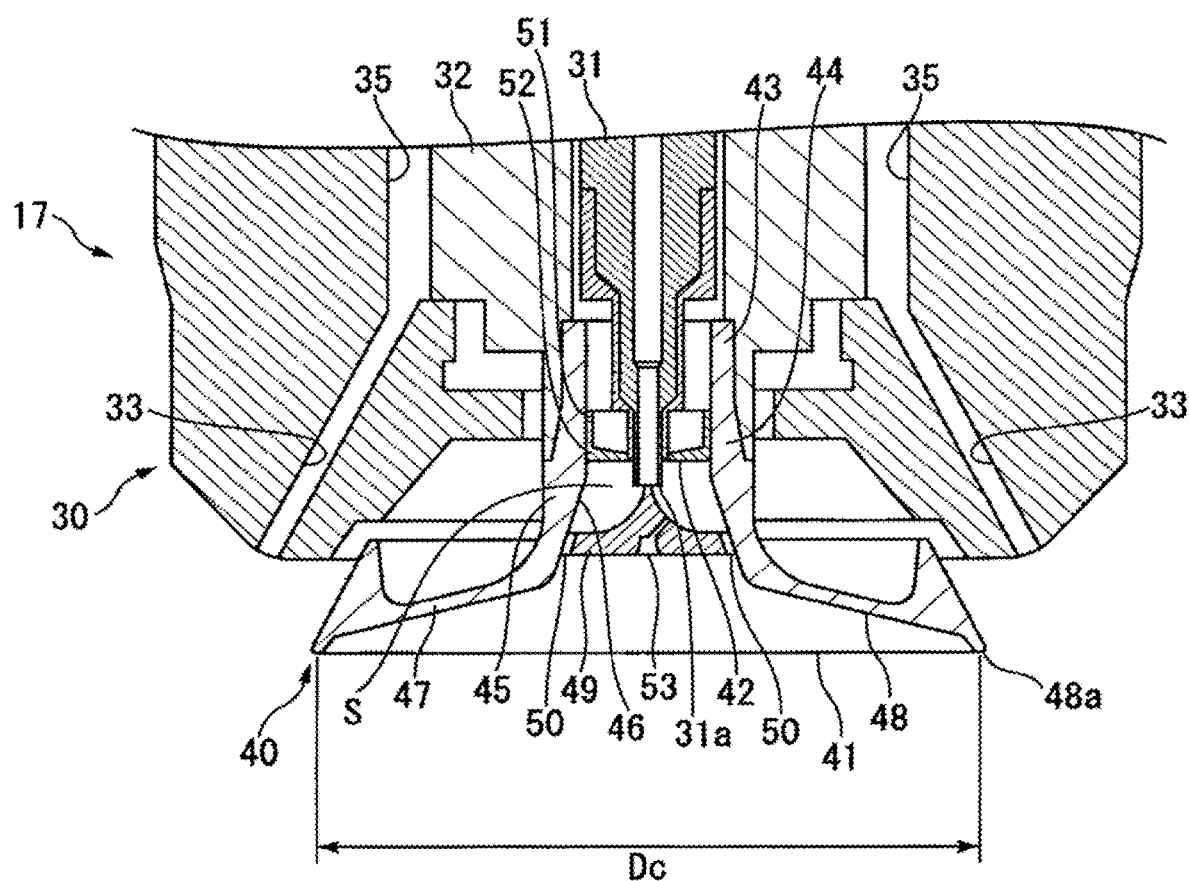
FIG. 6 is a schematic sectional view of an electrostatic coating gun 17 provided in the electrostatic coating apparatus in FIG. 5.
Figure 7:
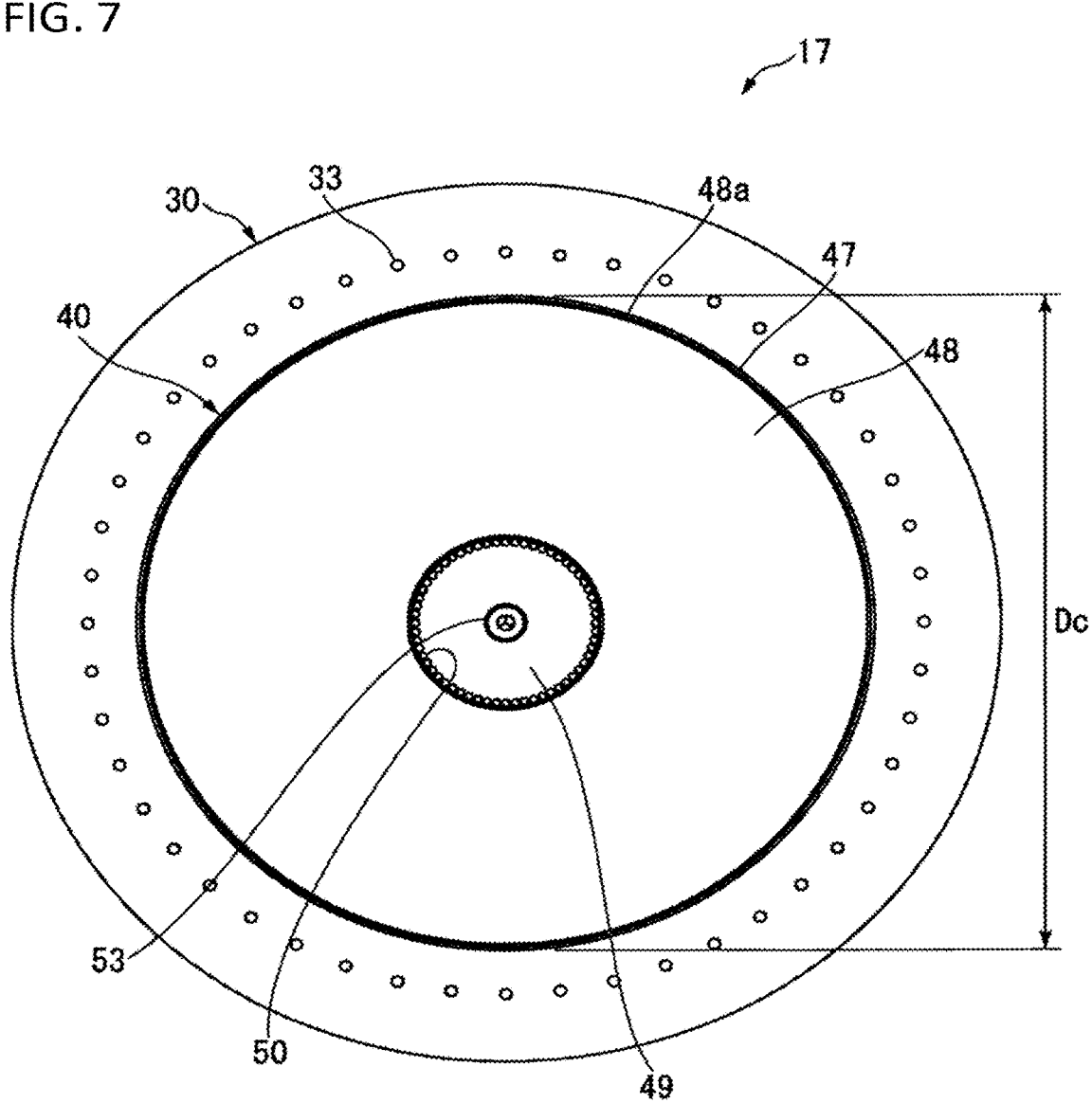
FIG. 7 is a schematic front view in which the electrostatic coating gun 17 in FIG. 6 is observed from the front.

FIG. 6 is a schematic sectional view of the electrostatic coating gun 17. FIG. 7 is a schematic front view in which the electrostatic coating gun 17 is observed from the front.

The electrostatic coating gun 17 has a gun body 30 and a rotary atomizing head 40. The rotary atomizing head 40 is disposed in a front end portion of the gun body 30 so as to direct the axis of the rotary atomizing head 40 in the front/rear direction.

In the electrostatic coating gun 17, the rotary atomizing head 40 is rotationally driven so that the coating composition supplied to the rotary atomizing head 40 can be atomized and released (that is, sprayed) due to centrifugal force.

In the description of the electrostatic coating gun 17, "front" in the front, the front end, etc. designates the spraying direction of the coating composition, and an opposite direction thereto is the rear. The lower side in FIG. 6 and FIG. 7 is the front in the electrostatic coating gun 17.

The electrostatic coating apparatus may have a plurality of electrostatic coating guns 17. It is preferable that a plurality of electrostatic coating guns are provided so that efficiency can be improved or a wide substrate can be coated efficiently. When a plurality of electrostatic coating guns 17 are provided, they may be disposed side by side in a direction perpendicular to the substrate conveyance direction. However, from the viewpoint of efficiency, it is preferable that the electrostatic coating guns 17 are disposed in a zigzag (staggered) manner in consideration of the coating width of each electrostatic coating gun 17 and the interference of electric fields among the electrostatic coating guns 17.

In the gun body 30, a coating material supply pipe 31 is fixedly stored on the same axis as the rotary atomizing head 40.

A not-shown air turbine motor is provided in the gun body 30, and a rotary shaft 32 is provided in the air turbine motor.

In addition, one of the two air supply lines 16a and 16b (for example, the supply line 16a) is connected to the air turbine motor so that the rotation frequency of the rotary shaft 32 can be controlled by air pressure from the supply line 16a. The rotary shaft 32 is disposed on the same axis as the rotary atomizing head 40 so as to enclose the coating material supply pipe 31.

An example where the air turbine motor is used as a unit for rotationally driving the rotary shaft 32 has been shown here. However, any rotary drive unit other than the air turbine motor may be used.

In the gun body 30, a plurality of outlets 33 for shaving air (also referred to as shaping air) are formed, and air supply channels 35 for supplying the shaving air to the outlets 33 respectively are formed. In addition, one of the two air supply lines 16a and 16b (for example, the supply line 16b) is connected to the air supply channels 35 so that the air (shaving air) can be supplied to the outlets 33 through the air supply channels 35.

The outlets 33 are formed to be open at equal intervals concentrically around the axis of the electrostatic coating gun 17 in front view of the electrostatic coating gun 17. In addition, the outlets 33 are formed to leave the axis gradually toward the front of the electrostatic coating gun 17 in side view of the electrostatic coating gun 17.

The rotary atomizing head 40 has a first part 41 and a second part 42. The first part 41 and the second part 42 have cylindrical shapes respectively.

In the first part 41, a shaft mounting portion 43, a retention portion 44, a peripheral wall 45, a diameter expansion portion 47, and a front wall 49 are formed integrally. The retention portion 44 is formed to extend to the front from the shaft mounting portion 43. The peripheral wall 45 is formed to extend to the front from the retention portion 44. The diameter expansion portion 47 is formed to extend to the front from the peripheral wall 45. The front wall 49 is formed to divide a center hole of the first part 41 into front and rear pieces in a boundary position between the peripheral wall 45 and the diameter expansion portion 47.

The retention portion 44 retains the second part 42 coaxially with respect to the first part 41.

The inner circumferential surface of the peripheral wall 45 serves as a tapered guide surface 46 all over the region in the axial direction of the rotary atomizing head 40. The diameter of the guide surface 46 is expanded gradually toward the front.

The diameter expansion portion 47 is formed into a cup-like shape whose diameter is expanded toward the front. The front surface of the diameter expansion portion 47 serves as a diffusion surface 48, which is formed to expand its diameter gradually toward the front.

A large number of fine notches for atomizing the coating composition are provided at substantially equal intervals all over an outer circumferential edge 48a of the diffusion surface 48 of the diameter expansion portion 47.

In the front surface 49, outflow holes 50 are formed to penetrate the outer circumferential edge of the front wall 49 in the front/back direction. The outflow holes 50 are formed into circles circumferentially at equal angle pitches. In addition, each outflow hole 50 penetrates the front wall 49 in parallel to the inclination direction of the guide surface 46 of the peripheral wall 45.

Of the rear surface of the front wall 49, a central part has a conical shape protruding toward the rear. In addition, in the central part, a through hole 53 is formed to extend rearward from a central portion of the front surface of the front wall 49, and diverge into three branches on the way. The three branches are open on the circumferential surface of the conical shape of the central part.

The second part 42 has a cylindrical portion 51 and a rear wall 52 formed integrally. The rear wall 52 is disposed in a front end portion of the cylindrical portion 51. At the center of the rear wall 52, a circular through hole is formed so that a front end portion of the coating material supply pipe 31 can be inserted thereto.

In the rotary atomizing head 40, a space enclosed by the front wall 49, the peripheral wall 45 and the rear wall 52 serves as a storage chamber S. The storage chamber S communicates with the diffusion surface 48 through the outflow holes 50.

In the electrostatic coating gun 17, the front end portion of the coating material supply pipe 31 is inserted into the through hole at the center of the rear wall 52 so as to make a discharge port 31a at the front end of the coating material supply pipe 31 open into the storage chamber S. Thus, the coating composition can be supplied into the storage chamber S through the coating material supply pipe 31.

The electrostatic coating apparatus and the electrostatic coating gun are not limited to the illustrated examples. A well-known electrostatic coating apparatus may be used as long as the electrostatic coating apparatus has an electrostatic coating gun with a rotary atomizing head. A well-known electrostatic coating gun may be used as long as the electrostatic coating gun has a rotary atomizing head.

(Coating Method)

In the electrostatic coating apparatus 10, the coating composition is applied onto the translucent substrate 3 in the following manner.

The translucent substrate 3 is placed on the electrically conductive substrate 21. In addition, high voltage is applied to each electrostatic coating gun 17 by the high voltage generating device 18. At the same time, the coating composition is supplied to the electrostatic coating gun 17 through the coating composition supply line 14, while the air is supplied to the electrostatic coating gun 17 from the two air supply lines 16a and 16b.

The air supplied from the air supply line 16b is introduced into the air supply channels 35 in the gun body 30 and blown as shaving air from the openings of the outlets 33.

The air supplied from the air supply line 16a drives the air turbine motor in the gun body 30 so as to rotate the rotary shaft 32. Thus, the coating composition supplied into the storage chamber S from the coating composition supply line 14 through the coating material supply pipe 31 moves forward along the guide surface 46 of the peripheral wall 45 due to centrifugal force. The coating composition passing through the outflow holes 50 is supplied to the diffusion surface 48. A part of the coating composition is supplied to the diffusion surface 48 through the through hole 53 at the central part. Here, the guide surface 46 of the peripheral wall 45 has a tapered shape whose diameter is expanded toward the outflow holes 50. Accordingly, the coating composition in the storage chamber S reaches the outflow holes 50 due to the centrifugal force surely without staying behind in the storage chamber S.

The coating composition supplied to the diffusion surface 48 moves toward the outer circumferential edge 48a while being diffused along the diffusion surface 48 due to the centrifugal force, and forms a liquid film of the coating composition on the diffusion surface 48. The liquid film is atomized at the outer circumferential edge 48a of the diffusion surface 48 in the diameter expansion portion 47, so as to fly out radially as droplets.

The droplets of the coating composition flying out from the rotary atomizing head 40 are guided toward the translucent substrate 3 by the flow of the shaving air. In addition, the droplets charged negatively are attracted toward the grounded translucent substrate 3 due to electrostatic force. Thus, the droplets are efficiently attached to the surface of the translucent substrate 3.

A part of the coating composition which has not been sprayed from the electrostatic coating gun 17 is recovered into a coating composition tank (not shown) through the coating composition recovery line 15. In addition, of the coating composition sprayed from the electrostatic coating gun 17, a part which has not been attached to the translucent substrate 3 is sucked into the exhaust box 20, and recovered through the exhaust duct 19.

The surface temperature of the translucent substrate 3 is preferably 60° C. or less, more preferably 15 to 50° C., and further more preferably 20 to 40° C. When the surface temperature of the translucent substrate 3 is not more than the upper limit of the aforementioned range, the adhesion between the translucent substrate 3 and the base layer 5 is good. When the surface temperature of the translucent substrate 3 is not less than the lower limit of the aforementioned range, the liquid medium (B) of the coating composition can be evaporated quickly to form sufficient concave and convex structure easily.

A preferred range of the temperature (coating temperature) of the coating composition sprayed from the electrostatic coating gun 17, and a preferred range of the temperature inside the coating booth 11 are the same as the aforementioned range. In addition, it is preferable that the atmosphere between the electrostatic coating gun 17 and the translucent substrate 3 is set at a temperature of 20° C. or more and a relative humidity of 60% or less in order to improve the film characteristic and the haze rate distribution of the base layer 5. The environment inside the coating booth 11 is more preferably in a temperature range of 20 to 30° C. and a relative humidity range of 25 to 45%, and further more preferably in a temperature range of 20 to 30° C. and a relative humidity range of 25 to 40%.

The conveyance velocity of the translucent substrate 3 is preferably 0.6 to 20.0 m/min, and more preferably 1.5 to 15.0 m/min. When the conveyance velocity of the translucent substrate 3 is 0.6 m/min or more, productivity is improved. When the conveyance velocity of the translucent substrate 3 is 20.0 m/min or less, it is easy to control the film thickness of the coating composition applied onto the translucent substrate 3.

The number of times of conveyance of the translucent substrate 3, that is, the number of times with which the coating composition is applied to the translucent substrate 3 passing under the electrostatic coating gun 17 can be set appropriately in accordance with desired haze, desired glossiness, etc. In terms of the antiglare property, the number of times is preferably once or more, and more preferably twice or more. In terms of the productivity, the number of times is preferably 10 or less, and more preferably 8 or less.

A diameter (which is the maximum diameter of the diffusion surface 48, hereinafter also referred to as "cup diameter") Dc of the outer circumferential edge 48a of the rotary atomizing head 40 of the electrostatic coating gun 17 is preferably 50 mm or more, more preferably 55 to 90 mm, and particularly preferably 60 to 80 mm. When the cup diameter is not less than the aforementioned lower limit, the centrifugal force during the rotation of the rotary atomizing head 40 is so large that the droplets of the coating composition flying out from the rotary atomizing head 40 is finer to make it easier to form the base layer 5 with a desired surface shape. When the cup diameter is not more than the upper limit of the aforementioned range, the cup can be rotated stably.

The distance between the nozzle front end of the electrostatic coating gun 17 (that is, the front end of the rotary atomizing head 40 in the spraying direction of the coating composition) and the translucent substrate 3 is adjusted appropriately in accordance with the width of the translucent substrate 3, the film thickness of the coating composition to be applied onto the translucent substrate 3, etc. The distance is typically 150 to 450 mm. When the distance to the translucent substrate 3 is reduced, the coating efficiency is indeed enhanced, but the distance reduced to be too short increases the probability of discharge, causing a problem on safety. On the other hand, as the distance to the translucent substrate 3 is increased, the coating region can be indeed expanded, but the distance increased to be too long causes a problem of deterioration in coating efficiency.

The voltage applied to the electrostatic coating gun 17 is adjusted appropriately in accordance with the coating quantity of the coating composition to be applied onto the translucent substrate 3, etc. The voltage is typically in a range of from −30 kV to −90 kV. There is a tendency that increase in absolute value of the voltage enhances the coating efficiency. Although depending on the liquid characteristic, the coating environment and the coating conditions, the coating efficiency is saturated when the applied voltage reaches some degree of height.

The supply rate of the coating composition supplied to the electrostatic coating gun 17 (hereinafter referred to as coating liquid rate) is adjusted appropriately in accordance with the coating quantity of the coating composition to be applied onto the translucent substrate 3, etc. The coating liquid rate is preferably less than 70 mL/min, and more preferably 10 to 50 mL/min. When the coating liquid rate is not more than the aforementioned upper limit, the droplets of the coating composition flying out from the rotary atomizing head 40 is finer to make it easier to form the base layer 5 with a desired surface shape. When the coating liquid rate is not less than the aforementioned lower limit, the in-plane haze distribution can be reduced.

The pressure of the air supplied to the electrostatic coating gun 17 from each of the two air supply lines 16a and 16b is adjusted appropriately in accordance with the coating quantity of the coating composition to be applied onto the translucent substrate 3, etc. The pressure is typically 0.01 MPa to 0.5 MPa.

A coating pattern of the coating composition can be controlled by the pressure of the air supplied to the electrostatic coating gun 17 from each of the two air supply lines 16a and 16b.

The coating pattern of the coating composition designates a pattern which is formed on the translucent substrate by the droplets of the coating composition sprayed from the electrostatic coating gun 17.

When the air pressure of the air supplied to the air turbine motor in the electrostatic coating gun 17 is increased, the rotation frequency of the rotary shaft 32 increases to increase the rotation frequency of the rotary atomizing head 40. Thus, the size of each droplet flying out from the rotary atomizing head 40 is reduced, showing a tendency of increase in the coating pattern.

When the air pressure of the air supplied to the air supply channels 35 in the electrostatic coating gun 17 is increased to increase the air pressure of the air (shaving air) blown out from the outlets 33, the spread of the droplets flying out from the rotary atomizing head 40 is suppressed, showing a tendency of decrease in the coating pattern.

The air pressure of the air supplied to the air turbine motor is set in accordance with the rotation frequency of the rotary atomizing head 40 (hereinafter also referred to as cup rotation frequency). The higher the air pressure is, the higher the cup rotation frequency is.

The cup rotation frequency is preferably 30,000 rpm or more, more preferably 30,000 to 80,000 rpm, and particularly preferably 32,000 to 80,000 rpm. When the cup rotation frequency is not less than the lower limit of the aforementioned range, the droplets of the coating composition flying out from the rotary atomizing head 40 is finer to make it easier to form the base layer 5 with a desired surface shape. When the cup rotation frequency is not more than the upper limit of the aforementioned range, the coating efficiency is excellent.

The cup rotation frequency can be measured by a meter (not shown) attached to the electrostatic coating apparatus 10.

It is preferable that the air pressure of the air supplied to the air supply channels 35 is set into pressure with which the air pressure of the shaving air (hereinafter also referred to as shaving pressure) can be set within a range of 0.01 to 0.3 MPa. The shaving pressure is more preferably 0.01 to 0.25 MPa, and particularly preferably 0.01 to 0.2 MPa. When the shaving pressure is not less than the lower limit of the aforementioned range, excellent improvement in coating efficiency can be attained by the improvement in effect of preventing the droplets from scattering. When the shaving pressure is not more than the upper limit of the aforementioned range, it is possible to secure the coating width.

[Firing Step]

In the firing step, the coating film of the coating composition formed on the translucent substrate 3 in the coating step is fired and formed into the base layer 5.

Firing may be performed concurrently with coating by heating the translucent substrate 3 when the coating composition is being applied onto the translucent substrate 3. Alternatively, firing may be performed by heating the coating film after the coating composition is applied onto the translucent substrate 3.

The firing temperature is preferably 30° C. or more. When the translucent substrate 3 is, for example, made of glass, the firing temperature is more preferably 100 to 750° C., and further more preferably 150 to 550° C.

[AR Layer Forming Step]

The surface of the base layer 5 has the aforementioned concave and convex structure. Accordingly, when the AR layer 7 is formed along the surface shape of the base layer 5 in the AR layer forming step, the AR layer 7 can be formed with the aforementioned concave and convex structure in its surface.

The method for forming the AR layer 7 is not limited particularly. A well-known method such as a dry method or a wet method can be used.

Examples of the dry method may include a sputtering method, a vacuum vapor deposition method, an ion plating method, a chemical vapor deposition method, etc. For example, sputtering is performed on metal (such as Si or Nb) as target under an oxygen atmosphere to form a layer of metal oxide.

According to the wet method, coating liquid containing a matrix or a precursor thereof and a liquid medium is applied and dried to form a layer. The coating liquid may further contain particles, additives, etc. if necessary.

For example, the aforementioned silica precursor (A), the binder (D), etc. may be included as the matrix or the precursor thereof. Ones similar to the aforementioned liquid medium (B), the particles (C) and the additive (E) may be included as the liquid medium, the particles and the additives respectively. Hollow particles are preferred as the particles. However, for the AR layer, the liquid medium does not have to include a certain ratio of the liquid medium (B1) having a boiling point of 150° C. or less.

Examples of methods for coating the coating liquid may include well-known wet coating methods (such as a spin coating method, a spray coating method, a dip coating method, a die coating method, a curtain coating method, a screen printing method, an inkjet method, a flow coating method, a gravure coating method, a bar coating method, a flexo coating method, a slit coating method, a roll coating method, and the like.

As the method for forming the AR layer 7, the dry method is preferred in terms of the antireflection property. Of the dry method, the sputtering method is more preferably from the viewpoint of the productivity.

According to the manufacturing method described above, a predetermined coating composition is sprayed by an electrostatic coating gun provided with a rotary atomizing head so that a layer having a concave and convex structure including the first convex portions 5a and the second convex portions 5b in its surface can be formed as the base layer 5. This can be considered as follows. That is, in comparison with the case where a spraying method (particularly a method using a two-fluid nozzle) which has been generally used in the background art, droplets of the coating composition are attached onto the translucent substrate 3 at a gentler rate, and of the droplets which have been attached, the liquid medium (B) is evaporated so quickly that the droplets cannot be spread easily on the translucent substrate 3. Thus, the coating film can be formed while sufficiently keeping the shape with which the droplets were attached (that is, the liquid medium (B) is removed as a whole. In addition, when the silica precursor (A) is contained, the silica precursor (A) becomes a matrix).

In addition, according to the aforementioned manufacturing method, the surface shape of the base layer 5 to be formed, and hence the surface shape of the AR layer 7 can be controlled by the viscosity of the coating composition, the coating conditions in the coating step (such as the cup diameter, the coating liquid rate, the cup rotation frequency, etc.), the temperature of the firing step, etc. For example, reduction in the viscosity of the coating composition, increase in the cup diameter, reduction in the coating liquid rate, or increase in the cup rotation frequency causes a tendency to reduce the size of droplets formed of the coating composition charged and sprayed out. The reduction in the size of the droplets leads to a tendency to increase the number of the second convex portions 5b and 7b per 1 $\mu m^2$.

Second Embodiment

Figure 8:
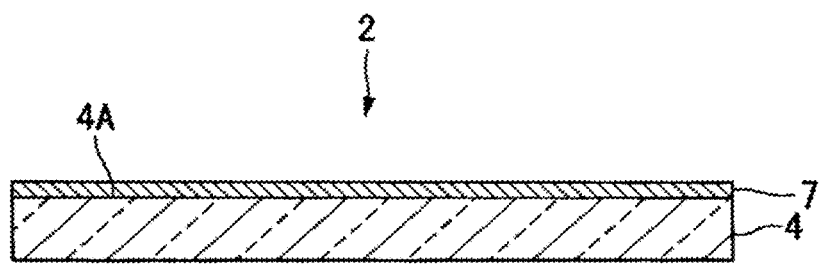
FIG. 8 is a schematic sectional view showing a second embodiment of a translucent structure in the present invention.
Figure 9:
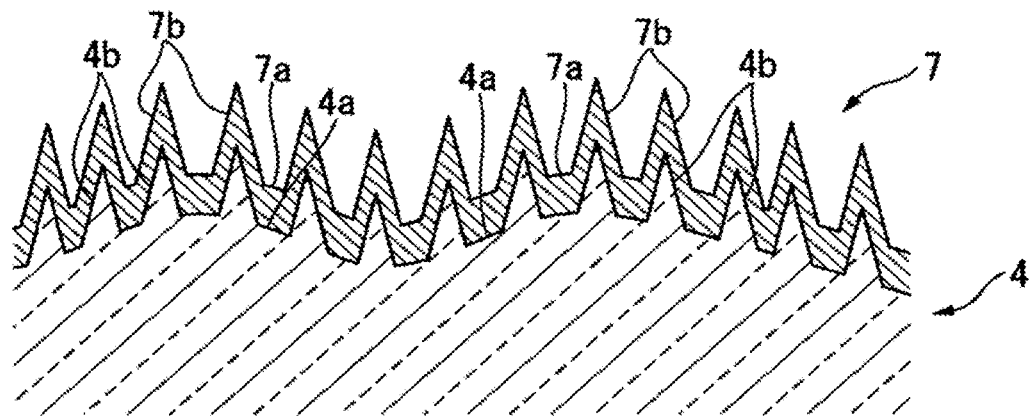
FIG. 9 is a schematic sectional view showing a surface shape of the translucent structure according to the second embodiment.

FIG. 8 is a schematic sectional view showing a second embodiment of a translucent structure in the present invention. FIG. 9 is a schematic sectional view showing a surface shape of the translucent structure according to the second embodiment. In the following embodiment, constituent elements corresponding to those in the aforementioned embodiment will be referenced correspondingly, and detailed description thereof will be omitted.

A translucent structure 2 according to the embodiment has a translucent substrate 4, and an AR layer 7 formed on a first surface 4A of the translucent substrate 4.

In the translucent substrate 4, the first surface 4A is located on a visible side. Each of the translucent substrate 4 and the AR layer 7 has a concave and convex structure on its surface. The AR layer 7 is located on the outermost visible side of the translucent structure 2. Therefore, the surface of the AR layer 7 is the visible-side outermost surface of the translucent structure 2.

The concave and convex structure in the surface of the translucent substrate 4 includes first convex portions 4a and second convex portions 4b.

The concave and convex structure in the surface of the translucent substrate 4 is similar to the concave and convex structure in the surface of the base layer 5 according to the first embodiment. A preferred mode thereof is also similar.

The translucent substrate 4 is the same as the translucent substrate 3 according to the first embodiment, except that the concave and convex structure is provided in the first surface 4A. A preferred mode thereof is also similar.

In the translucent structure 2, the concave and convex structure in the first surface 4A of the translucent substrate 4 may be the same as the concave and convex structure in the surface of the AR layer 7, or may be different therefrom. For example, at least one of the average diameter (based on true circle conversion) and the maximum height between the first convex portions 4a and 7a, and the average height and the number per 1 µm$^2$ between the second convex portions 4b and 7b may be different.

It is preferable that the concave and convex structure in the surface of the AR layer 7 follow the concave and convex structure in the first surface 4A of the translucent substrate 4 as shown in FIG. 9. In this case, the concave and convex structure in the surface of the AR layer 7 may have a smaller angle or a smaller difference in height than the concave and convex structure in the first surface 4A of the translucent substrate 4. For example, the average height of the second convex portions 7b may be lower than the average height of the second convex portions 4b.

The preferred ranges of the 60° relative-specular glossiness in the visible-side outermost surface of the translucent structure 2 (the surface of the AR layer 7 in the embodiment), the haze of the translucent structure 2, the reflectivity based on the SCI method, and the sparkle index value S are similar to those in the first embodiment respectively.

<Operation and Effect>

In the translucent structure 2, the AR layer 7 is provided on the visible side of the translucent substrate 4, and the concave and convex structure which includes the first convex portions 7a and the second convex portions 7b and in which the number of the second convex portions 7b is 0.0001 to 1.2 per 1 µm$^2$ is provided in the visible-side outermost surface. Accordingly, in the same manner as the aforementioned translucent structure 1, the translucent structure 2 is excellent in antiglare property and antireflection property, and sparkle is suppressed sufficiently.

<Method for Manufacturing Translucent Structure>

For example, the translucent structure 2 can be manufactured in the following method. That is, a surface of a translucent substrate which has not had the aforementioned concave and convex structure yet is etched twice or more in different etching conditions to form the aforementioned concave and convex structure. Thus, the translucent substrate 4 is manufactured. The AR layer 7 is formed on the concave and convex structure of the translucent substrate 4.

For example, the first convex portions are formed in the first time of the etching process, and the second convex portions are formed in the second time of the etching process. Thus, the aforementioned concave and convex structure is formed.

The etching process can be performed using various known etching methods in accordance with the material of the translucent substrate, a required haze, etc. It is preferable that the etching rate in the second time of the etching process is higher than the etching rate in the first time of the etching process.

In addition, a base layer may be formed on the translucent substrate which has been etched, or the translucent substrate in which a base layer has been formed may be etched. For example, after the translucent substrate is etched to form the first convex portions, a coating composition is applied to form the second convex portions. Thus, the aforementioned concave and convex structure is formed.

When the translucent substrate is, for example, a glass substrate, a method for bringing a fluorinating agent into contact with a surface of the glass substrate may be used as the etching method. In the glass surface in contact with the fluorinating agent, the fluorinating agent reacts with $SiO_2$ serving as a skeleton structure of the glass to generate $SiF_4$ (gas). Remaining components which have lost the skeleton structure form silicofluoride to make the concave and convex structure in the glass surface. Examples of such fluorinating agents may include fluorine alone ($F_2$), hydrogen fluoride (HF), etc. According to this method, the shape of the concave and convex structure to be formed can be adjusted by the kind of fluorinating agent to be used, the period of time to set the fluorinating agent in contact with the glass surface, the etching temperature, etc.

For example, a blasting treatment, an ion etching treatment, or the like, may be used as a glass substrate etching method other than the method in which the fluorinating agent is bringing into contact, or as an etching method which can be also applied to a translucent substrate made of another material than glass.

Third Embodiment

Figure 10:
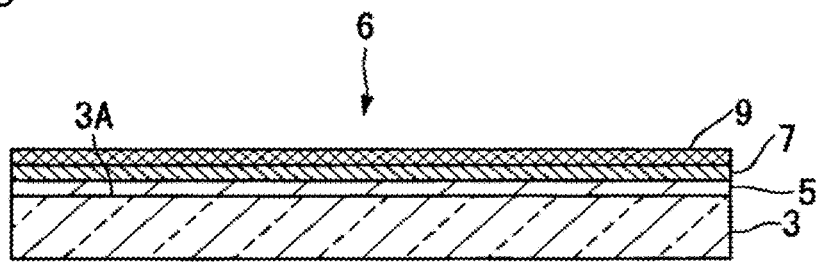
FIG. 10 is a schematic sectional view showing a third embodiment of a translucent structure in the present invention.
Figure 11:
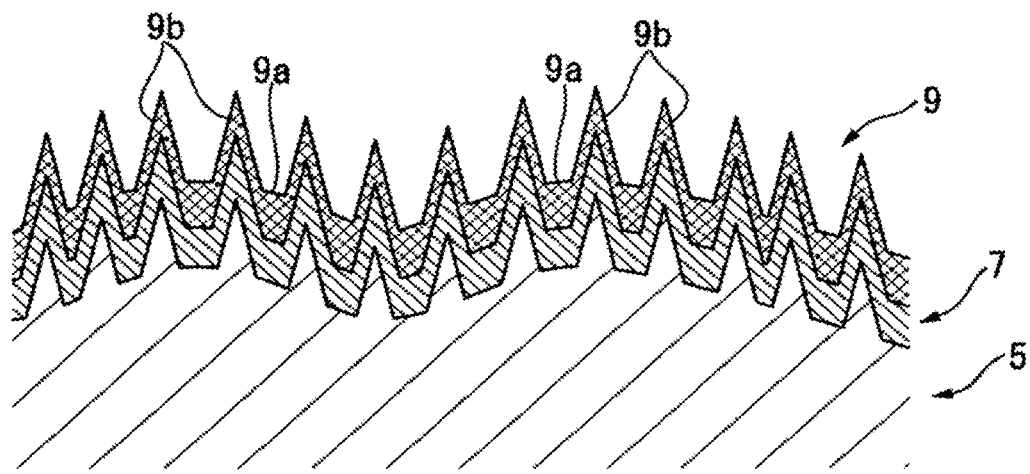
FIG. 11 is a schematic sectional view showing a surface shape of the translucent structure according to the third embodiment.

FIG. 10 is a schematic sectional view showing a third embodiment of a translucent structure in the present invention. FIG. 11 is a schematic sectional view showing a surface shape of the translucent structure according to the embodiment.

A translucent structure 6 according to the embodiment has a translucent substrate 3, a base layer 5 formed on a first surface 3A of the translucent substrate 3, an AR layer 7 formed on the base layer 5, and a water-repellent and oil-repellent layer (hereinafter also referred to as "AFP layer") 9 formed on the AR layer 7.

In the translucent substrate 3, the first surface 3A is located on a visible side. Each of the base layer 5, the AR layer 7 and the AFP layer 9 has a concave and convex structure on its surface. In the translucent structure 6, the AFP layer 9 is located on the outermost visible side, and the AR layer 7 is located just under the AFP layer 9. Therefore, the surface of the AFP layer 9 is the visible-side outermost surface of the translucent structure 6.

(AFP Layer)

The AFP layer is a layer based on so-called Anti Finger Print, for which a silane compound having a perfluoropolyether group is used favorably.

For example, a material containing a compound expressed by the following formula (A) and/or its partial hydrolytic condensate is used as the material of the AFP layer.

(1): $Rf^3$—$Rf^2$—$Z^1$   Formula (A)

(In the formula, $Rf^3$ designates a group of $C_mF_{2m+1}$ (where m is an integer of 1 to 6);

$Rf^2$ designates —O—$(C_aF_{2a}O)_n$— (where a is an integer of 1 to 6, n is an integer of 1 or more, and when n is 2 or more, the units of —$C_aF_{2a}O$— may be the same or different); and $Z^1$ designates a group of -$Q^2$-$\{CH_2CH(SiR^2_qX^2_{3-q})\}_r$—H (where $Q^2$ designates —$(CH_2)_s$— (where s is an integer of 0 to 12) or —$(CH_2)_s$— containing at least one kind selected from an ester bond, an ether bond, an amide bond, an urethane bond and a phenylene group, and a part or all of the units of —$CH_2$— may be replaced by units of —$CF_2$— and/or units of —$CFCF_3$—; $R^2$ designates a hydrogen atom or a univalent hydrocarbon group having 1 to 6 carbon atoms, and the hydrocarbon group may contain a substituent; $X^2$ designates a hydroxide group or a hydrolyzable group individually; q is an integer of 0 to 2; and r is an integer of 1 to 20).)

Ones similar to those listed for the silane compound (A1) may be used as the hydrolyzable group in $X^2$.

It is preferable that the thickness of the AFP layer 7 is 5 nm or more. When the thickness is 5 nm or more, sufficient water repellency and oil repellency can be shown, and good slidability with fingers can be obtained in the surface of the AFP layer 7. In addition, when the thickness is 15 nm or less, influence on the antireflection property can be reduced favorably. However, even the AFP layer 7 whose thickness is more than 15 nm may be used.

The concave and convex structure in the surface of the AFP layer 7 includes first convex portions 7a and second convex portions 7b.

The concave and convex structure in the surface of the AFP layer 7 is similar to the concave and convex structure in the surface of the base layer 5 according to the first embodiment. A preferred mode thereof is also similar.

In the translucent structure 6, the concave and convex structure in the surface of the base layer 5, the concave and convex structure in the surface of the AR layer 7, and the concave and convex structure in the surface of the AFP layer 9 may be the same or different as long as they satisfy the aforementioned requirements. For example, of the average diameters (based on true circle conversion) and the maximum heights of the first convex portions 5a, 7a and 9a, and the average heights and the numbers per 1 $\mu m^2$ of the second convex portions 5b, 7b and 9b, one or more may be different from one another.

It is preferable that the concave and convex structure in the surface of the AFP layer 9 follow the concave and convex structure in the surfaces of the base layer 5 and the AR layer 7 as shown in FIG. 11. In this case, the concave and convex structure in the surface of the AFP layer 9 may have a smaller angle or a smaller difference in height than the concave and convex structure in the surface of the base layer 5 or the concave and convex structure in the surface of the AR layer 7. For example, the average height of the second convex portions 9b may be lower than the average height of the second convex portions 5b or 7b.

The preferred ranges of the 60° relative-specular glossiness in the visible-side outermost surface (the surface of the AFP layer 9 in the embodiment) of the translucent structure 6, the haze of the translucent structure 6, the reflectivity based on the SCI method, and the sparkle index value S are similar to those in the first embodiment respectively.

<Operation and Effect>

In the translucent structure 6, the AR layer 7 is provided on the visible side of the translucent substrate 3, and the concave and convex structure which includes the first convex portions 9a and the second convex portions 9b and in which the number of the second convex portions 9b is 0.0001 to 1.2 per 1 $\mu m^2$ is provided in the visible-side outermost surface. Accordingly, in the same manner as the aforementioned translucent structure 1, the translucent structure 6 is excellent in antiglare property and antireflection property, and sparkle is suppressed sufficiently.

In addition, due to the AFP layer 7 disposed in the visible-side outermost layer, slidability with fingers is good. The good slidability with fingers is, for example, favorable in terms of operability of a touch panel.

<Method for Manufacturing Translucent Structure>

For example, the translucent structure 6 can be manufactured in the following method. That is, the base layer 5 and the AR layer 7 are formed sequentially on the first surface 3A of the translucent substrate 3 in the manufacturing method described in the first embodiment. The surface of the AR layer 7 is treated with a water and oil repellent agent to form the AFP layer 9.

When the surface of the AR layer 7 is treated with the water and oil repellent agent, the AFP layer 9 is formed along the surface of the AR layer 7. Accordingly, although a slight fluctuation can occur in the shape of the surface of the AFP layer 9, the AFP layer 9 has a concave and convex structure with a similar shape to the concave and convex structure in the surface of the AR layer 7.

Examples of methods for the treatment with the water and oil repellent agent may include a vapor deposition method, a squeegee coating method, a wipe coating method, a flow coating method, etc. Thermal treatment may be performed after film formation. The thermal treatment may be, for example, performed in the atmosphere and on conditions of 50 to 200° C., intervals of 3 to 120 minutes, etc. The thermal treatment may be performed while humidifying to a relative humidity of 50 to 90%.

Fourth Embodiment

Figure 12:
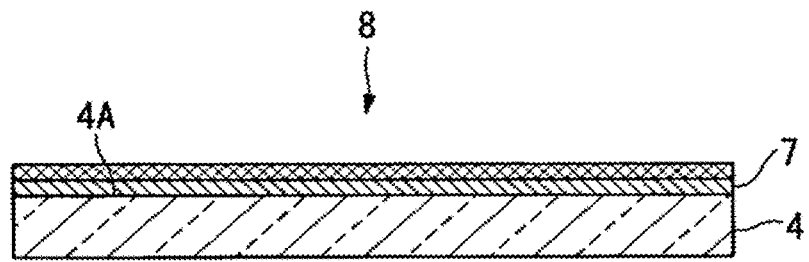
FIG. 12 is a schematic sectional view showing a fourth embodiment of a translucent structure in the present invention.
Figure 13:
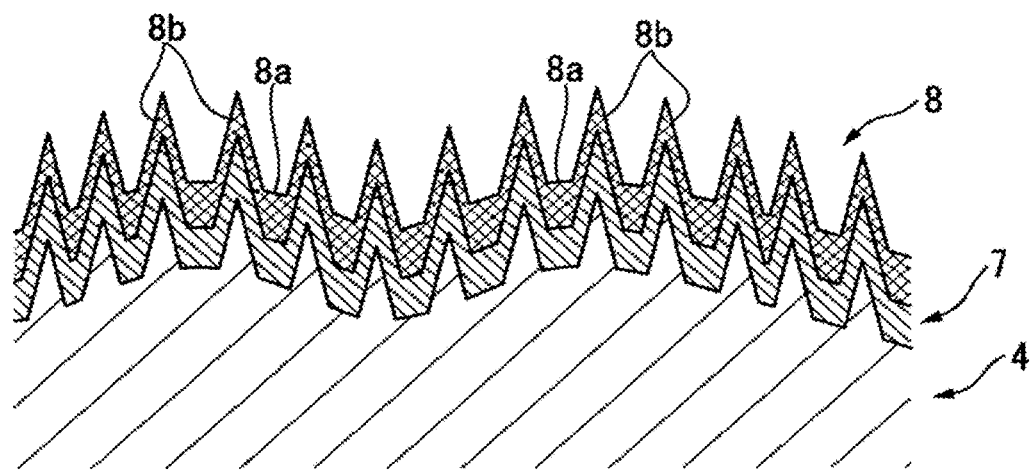
FIG. 13 is a schematic sectional view showing a surface shape of the translucent structure according to the fourth embodiment.

FIG. 12 is a schematic sectional view showing a fourth embodiment of a translucent structure in the present invention. FIG. 13 is a schematic sectional view showing a surface shape of the translucent structure according to the fourth embodiment.

A translucent structure 8 according to the embodiment has a translucent substrate 4, an AR layer 7 formed on a first surface 4A of the translucent substrate 4, and an AFP layer 9 formed on the AR layer 7.

In the translucent substrate 4, the first surface 4A is located on a visible side. Each of the AR layer 7 and the AFP layer 9 has a concave and convex structure on its surface. In the translucent structure 8, the AFP layer 9 is located on the outermost visible side, and the AR layer 7 is located just under the AFP layer 9. Therefore, the surface of the AFP layer 9 is the visible-side outermost surface of the translucent structure 8.

In the translucent structure 8, the concave and convex structure in the first surface 4A of the translucent substrate 4, the concave and convex structure in the surface of the AR layer 7, and the concave and convex structure in the surface of the AFP layer 9 may be the same or different. For example, of the average diameters (based on true circle conversion) and the maximum heights of the first convex portions 4a, 7a and 9a, and the average heights and the numbers per 1 µm² of the second convex portions 4b, 7b and 9b, one or more may be different from one another.

It is preferable that the concave and convex structure in the surface of the AFP layer 9 follow the concave and convex structure in the surfaces of the first surface 4A of the translucent substrate 4 and the AR layer 7 as shown in FIG. 13. In this case, the concave and convex structure in the surface of the AFP layer 9 may have a smaller angle or a smaller difference in height than the concave and convex structure in the first surface 4A of the translucent substrate 4 or the concave and convex structure in the surface of the AR layer 7. For example, the average height of the second convex portions 9b may be lower than the average height of the second convex portions 4b or 7b.

The preferred ranges of the 60° relative-specular glossiness in the visible-side outermost surface (the surface of the AFP layer 9 in the embodiment) of the translucent structure 8, the haze of the translucent structure 6, the reflectivity based on the SCI method, and the sparkle index value S are similar to those in the first embodiment respectively.

<Operation and Effect>

In the translucent structure 8, the AR layer 7 is provided on the visible side of the translucent substrate 4, and the concave and convex structure which includes the first convex portions 9a and the second convex portions 9b and in which the number of the second convex portions 9b is 0.0001 to 1.2 per 1 µm² is provided in the visible-side outermost surface. Accordingly, in the same manner as the aforementioned translucent structure 6, the translucent structure 8 is excellent in antiglare property and antireflection property, and sparkle is suppressed sufficiently. In addition, due to the AFP layer 7 disposed in the visible-side outermost layer, slidability with fingers is good.

<Method for Manufacturing Translucent Structure>

For example, the translucent structure 8 can be manufactured in the following method. That is, the translucent substrate 4 is manufactured in the manufacturing method described in the second embodiment. The AR layer 7 is formed on the first surface 4A of the translucent substrate 4. The surface of the AR layer 7 is then treated with a water and oil repellent agent to form the AFP layer 9.

The methods listed in the third embodiment can be used as the method for the treatment with the water and oil repellent agent.

Although the translucent structure in the present invention has been described along the illustration of the first to fourth embodiments, the invention is not limited to the embodiments. Respective configurations and combinations thereof in the aforementioned embodiments are exemplary, and various additions, removals, replacements and other changes in the configurations can be made without departing from the gist of the invention.

For example, although each of the first and third embodiments showed an example in which the base layer 5 has a specific concave and convex structure in its surface, the shape of the visible-side outermost surface is important from the viewpoint of the antiglare property and the sparkle suppression. Accordingly, the surface of the base layer 5 which is not located in the visible-side outermost surface does not have to have the concave and convex structure. For example, the surface of the base layer 5 may have a concave and convex structure including the first convex portions 5a but not including the second convex portions 5b. In the same manner, the first surface 4A of the translucent substrate 4 in the second embodiment or the surface of the AR layer 7 in the third or fourth embodiment does not have the concave and convex structure. In order to make it easy to manufacture a translucent structure having a specific concave and convex structure in its outermost surface, it is preferable that a base layer having a specific concave and convex structure in its surface is provided between a translucent substrate and an antireflection film or a specific concave and convex structure is provided in the surface of the translucent substrate.

{Applications}

Applications of the translucent structure in the present invention are not limited particularly. Specific examples of the applications may include transparent components for vehicles (headlight covers, side mirrors, front transparent substrates, side transparent substrates, rear transparent substrates, instrument panel surfaces, etc.), meters, building windows, show windows, displays (notebook type personal computers, monitors, LCDs, PDPs, ELDs, CRTs, PDAs, etc.), LCD color filters, touch panel substrates, pickup lenses, optical lenses, spectacle lenses, camera components, video components, CCD cover substrates, optical fiber ends, projector components, copying machine components, solar cell transparent substrates (cover glasses, etc.), cellular phone windows, backlight unit components (light guides, cold cathode tubes, etc.), backlight unit component liquid crystal luminance improving films (prisms, semitransparent films, etc.), liquid crystal luminance improving films, organic EL light emitting element components, inorganic EL light emitting element components, fluorescence light emitting element components, optical filters, optical component ends, lighting lamps, lighting fixture covers, amplification laser light sources, antireflection films, polarizing films, agricultural films, etc.

As applications of the translucent structure in the present invention, interior components of transport machines are preferred because an antiglare property, an antireflection property and a low sparkle property can be attained at a high level. On-vehicle articles are more preferable. Preferred examples of on-vehicle articles may include on-vehicle systems provided with image display devices (car navigation systems, instrument panels, head-up displays, dashboards, center consoles, shift knobs, etc.).

<<Article>>

An article in the present invention has the aforementioned translucent structure.

The article in the present invention may consist of the aforementioned translucent structure, or may further have members other than the translucent structure.

Examples of articles in the present invention may include articles listed as the aforementioned applications of the translucent structure, apparatus provided with at least one kind of those articles, etc.

Examples of such apparatus may include an image display device, a system provided therewith, a lighting device, a system provided therewith, a solar cell module, etc.

An article in the present invention is preferably an image display device or a system provided therewith in terms of optical properties such as haze, glossiness, an antiglare property, an antireflection property, etc.

When the article in the present invention is an image display device, the image display device has an image display device body for displaying an image, and a translucent structure in the present invention which is provided on the visible side of the image display device body.

Examples of the image display device body may include a liquid crystal panel, an organic EL (electroluminescence) panel, a plasma display panel, etc.

The translucent structure may be provided as a protective plate for the image display device body integrally with the image display device body, or may be disposed as various filters on the visible side of the image display device body.

In the image display device or a system provided therewith, as described above, the translucent structure in the present invention is provided on the visible side of the image display device body. Accordingly, visibility is good.

EXAMPLES

The invention will be described below in detail along illustration of its examples. However, the invention is not limited to the following description.

Of Cases 1 to 15 which will be described later, Cases 4 to 5, 7, 9 to 10, 12 to 13, and 15 are inventive examples, and Cases 1 to 3, 6, 8, 11 and 14 are comparative examples.

Evaluation methods and materials used in the respective cases will be described below.

<Evaluation Methods>
(Measurement of Liquid Viscosity)

Liquid viscosity was measured by a B-type viscometer manufactured by EKO Instruments.

(Measurement of Surface Shape)

The surface shape of the visible-side outermost surface (the surface of a substrate in Case 1, a surface opposite to the substrate side in Cases 2 to 15) of the translucent structure was measured by a laser microscope VK-X100 manufactured by Keyence Corporation (using "×100" as an objective lens; observation region: 107 μm×143 μm or 109 μm×145 μm, magnification: 1,000 times).

Here, why two kinds of observation regions are shown is that the observation regions differ due to individual differences among objective lenses even when the lenses have the same specification of ×100. Each measurement result is expressed by the maximum, minimum and average values within an observation region thereof. Therefore, a slight difference between observation regions leads to little difference between results thereof as long as objective lenses having the same magnification of ×100 are selected. A measurement mode was set in "surface shape", the measurement quality was set in "standard (1024×768)", and the pitch was set in "0.08 μm".

(Analysis of Surface Shape)

xyz data of a surface shape obtained by the measurement of the surface shape were analyzed by image processing software SPIP (version 5.1.11) manufactured by Image Metrology A/S, and the following items were calculated.

maximum height of first convex portions (P to V);

average diameter of first convex portions (of cut surfaces of convex portions located in section at height of 0.05 μm from bearing height, an average value of diameters (based on true circle conversion) of cut surfaces of convex portions whose diameters (based on true circle conversion) exceed 10 μm);

average diameter of second convex portions (of cut surfaces of convex portions located in section at height of 0.5 μm from bearing height, an average value of diameters (based on true circle conversion) of cut surfaces of convex portions whose diameters (based on true circle conversion) are 1 to 10 μm);

maximum diameter and minimum diameter of second convex portions (of cut surfaces of convex portions located in section at height of 0.5 μm from bearing height and having diameters (based on true circle conversion) of 1 to 10 μm, diameter (based on true circle conversion) of cut surface of convex portion whose diameter is smallest, and diameter (based on true circle conversion) of cut surface of convex portion whose diameter is largest);

number of second convex portions (number of cut surfaces of convex portions located in section at height of 0.5 μm from bearing height and having diameters (based on true circle conversion) of 1 μm or more) in observation region (measuring 107 μm×143 μm or 109 μm×145 μm);

density of second convex portions (number of second convex portions in observation region converted into value per 1 μm$^2$); and average height of second convex portions (value obtained by measuring heights of second convex portions located within measured region with reference to bearing height, and averaging the measured heights).

In detail, the items were calculated in the following procedures respectively.

For calculating the maximum height (P to V) of the first convex portions, in inclination correction, "custom" was selected as most frequent value (mode), "setting minimum value as zero" was selected as Z-offset method, and "particle detection" was set as detection method. In shape formation, "saving holes in shape" was removed, "smoothing shape contour" was selected, and "filter size" was set at 51 points. In filtering, "including shape of image end" was selected, and the diameter minimum value was set at 10.0 μm. A threshold level was increased, and the threshold level where a shape with a diameter of 10 μm or more was not detected was regarded as the maximum height (P to V) of the first convex portions.

For calculating the average diameter of the first convex portions, in inclination correction, "quality preference" was selected as most frequent value (mode), "setting bearing height as zero" was selected as Z-offset method, and "particle detection" was set as detection method. In shape formation, "saving holes in shape" was removed, "smoothing shape contour" was selected, and "filter size" was set at 51 points. A threshold level was set at 0.05 μm. In filtering, the selection of "including shape of image end" was selected, and the diameter minimum value was set at 10.0 μm.

For calculating the average diameter of the second convex portions, the maximum diameter and the minimum diameter of the second convex portions, the number of the second convex portions in the observation region, and the average height of the second convex portions likewise, in inclination correction, "quality preference" was selected as most frequent value (mode), "setting bearing height as zero" was selected as Z-offset method, and "particle detection" was set as detection method. In shape formation, "saving holes in shape" was removed, "smoothing shape contour" was selected, and "filter size" was set at 51 points. A threshold level was set at 0.05 μm. In filtering, the selection of "including shape of image end" was removed, and the diameter minimum value was set at 1.0 μm.

(Measurement of Sparkle)

For the translucent structure, the sparkle index value S was measured by EyeScale ISC-A manufactured by I-System Co., Ltd.

Based on the sparkle index value S, sparkle was evaluated by the following criteria.

D: sparkle index S≥100 (conspicuous sparkle observed)
C: sparkle index 80≤S<100 (level with sparkle observed but with no problem in practical use)
B: index 60≤S<80 (level with slight sparkle observed)
A: index S<60 (level with no sparkle)

(Measurement of Haze)

The haze of the translucent structure was measured by a haze meter (HR-100 type manufactured by Murakami Color Research Laboratory Co., Ltd.) according to a method stipulated in JIS K7136:2000.

(60° Relative-Specular Glossiness)

60° relative-specular glossiness was measured as glossiness in the visible-side outermost surface of the translucent structure. The 60° relative-specular glossiness was measured at a substantially central portion of the outermost surface without erasing reflection on the back surface of the translucent structure, by use of a gloss meter (MULTI GLOSS 268Plus, manufactured by Konica Minolta, Inc.) according to a method stipulated in 60° relative-specular glossiness of JIS Z8741:1997.

(Y(SCI))

The reflectivity Y (%) based on the SCI method is measured by CM-2600d manufactured by Konica Minolta, Inc.

(Slidability with Fingers)

Slidability with fingers in the visible-side outermost surface of the translucent structure was evaluated by the following criteria.

A: very slippery and smooth feeling of touch when the surface was touched with fingers B: unsmooth feeling of touch when the surface was touched with fingers (Preparation of Base Liquid (A))

Silicate 40 (a mixture of tetraethoxysilane and its hydrolytic condensate, manufactured by Tama Chemicals Co., Ltd.) as the silica precursor (A) was added to denatured ethanol (SOLMIX (registered trademark) AP-11, manufactured by Japan Alcohol Trading Co., Ltd., which is a mixture solvent mainly composed of ethanol; the same thing will be applied to the following description) as the liquid medium (B), and stirred for 30 minutes. A liquid mixture of ion exchanged water and a nitric acid aqueous solution (nitric acid concentration: 61 mass %) was added thereto and stirred for 60 minutes to prepare a base liquid (A).

(Preparation of Silane Compound Solution (B))

A mixture of ion exchanged water and a nitric acid aqueous solution (nitric acid concentration: 61 mass %) was added to denatured ethanol, and stirred for 5 minutes. 1,6-bis(trimethoxysilyl)hexane (KBM-3066, manufactured by Shin-Etsu Chemical Co., Ltd.) as the silica precursor (A) was added thereto, and stirred in a water bath at 60° C. for 15 minutes, to prepare a silane compound solution (B).

(Preparation of Coating Liquid (C))

The aforementioned base liquid (A) and the aforementioned silane compound solution (B) were mixed to prepare a coating liquid (C).

(Preparation of Base Liquid (D))

Denatured ethanol, vinyltrimethoxysilane and scaly silica particle dispersion (manufactured by a method stipulated in Japanese Patent No. 4063464, viscosity at 25° C.: 0.100 Pa·s) were added and stirred for 30 minutes. A liquid mixture of ion exchanged water and a nitric acid aqueous solution (nitric acid concentration: 61 mass %) was added thereto and stirred for 60 minutes to prepare a base liquid (D).

(Preparation of Coating Liquid (C))

A coating liquid (C) was prepared by the same operation as in the preparation of the coating liquid (C), except that the base liquid (A) was replaced by the aforementioned base liquid (D).

(Preparation of Coating Liquid (F))

A coating liquid (F) was prepared by the same operation as in the preparation of the coating liquid (C), except that vinyltrimethoxysilane used for preparing the base liquid (A) was replaced by Silicate 40.

(Preparation of Coating Liquid (G))

A coating liquid (G) was prepared by the same operation as in the preparation of the base liquid (D), except that vinyltrimethoxysilane was replaced by Silicate 40.

(Preparation of Hollow $SiO_2$ Fine Particle Dispersion (H))

30 g of ZnO fine particle aqueous dispersion (solid concentration: 20 mass %, average primary particle size: 30 nm) and 10 g of tetraethoxysilane (solid content expressed in terms of $SiO_2$: 29 mass %) were added to 59 g of ethanol which was being stirred. 1 g of 28 mass % ammonia aqueous solution was then added thereto, to adjust pH of the dispersion to 10. The dispersion was stirred at 20° C. for 6 hours, to obtain 100 g of a core-shell type fine particle dispersion (solid concentration: 6 mass %).

100 g of strongly acidic cation exchange resin (DIAION, manufactured by Mitsubishi Chemical Corporation, total exchange capacity: 2.0 mseq/mL or more) was added to the obtained core-shell type fine particle dispersion, and stirred for 1 hour. After the pH reached 4, the strongly acidic cation exchange resin was removed by filtering, and the dispersion was ultra-filtered to obtain a hollow $SiO_2$ fine particle dispersion (H) in which the solid concentration expressed in terms of $SiO_2$ was 15 mass %. The shell thickness of each hollow $SiO_2$ fine particle was 8 nm, the pore diameter was 26 nm, and the average primary particle size was 42 nm.

(Matrix Precursor Solution (I))

Colcoat P manufactured by Colcoat Co., Ltd. (a solution of hydrolytic condensate of alkoxysilane, solid concentration expressed in terms of $SiO_2$: 2 mass %, ethanol: 4 mass %, isopropanol: 40 mass %, n-butanol: 50 mass %, water: 4 mass %) was prepared as a matrix precursor solution (I).

[Case 1]

Dragontrail (registered trademark) which was a chemically strengthening special glass manufactured by Asahi Glass Co., Ltd. (size: 100 mm×100 mm, thickness: 1.1 mm, transmittance at wavelength of 550 nm: 91.4%, arithmetic average surface roughness Ra: 0.13 nm (measured by SPA400-AFM manufactured by EKO Instruments)) was prepared as a substrate. Chemically strengthening treatment at 410° C. for 2.5 hours was performed on the substrate using $KNO_3$ molten salt. As a result of the chemically strengthening treatment, DOL (Depth Of Layer) was 25 μm, and CS (Compressive Stress) was 750 MPa. The chemically strengthened substrate was used as a translucent structure in Case 1.

[Case 2]

(Pretreatment of Substrate)

The same substrate as that in Case 1 was prepared, and chemically strengthening treatment at 410° C. for 2.5 hours was performed on the substrate using $KNO_3$ molten salt. Next, performed was pretreatment for cleansing the surface thereof with a neutral detergent, washing the surface with pure water and drying the surface.

(Forming AR Layer by Sputtering Method)

The substrate subjected to the pretreatment was set in a substrate holder of a thin film forming apparatus.

While introducing argon gas and oxygen gas into the thin film forming apparatus to set partial pressure of the argon gas at 0.3 Pa and set partial pressure of the oxygen gas at 0.3 Pa, sputtering was performed using an Nb target with a supplying power of 10 kW, to form a high-refractive-index layer having a thickness of about 13 nm and a refractive index (n) of 2.36 on the substrate. Next, while introducing argon gas and oxygen gas to set partial pressure of the argon gas at 0.29 Pa and set partial pressure of the oxygen gas at 0.27 Pa, sputtering was performed using an Si target with a supplying power of 10 kW, to form a low-refractive-index layer having a thickness of about 35 nm and a refractive index (n) of 1.47 on the aforementioned high-refractive-index layer.

After that, a high-refractive-index layer having a thickness of about 115 nm was formed on the aforementioned low-refractive-index layer by the same forming method and using the same material as the aforementioned high-refractive-index layer. Further on this high-refractive-index layer, a low-refractive-index layer having a thickness of about 89 nm was formed by the same forming method and using the same material as the aforementioned low-refractive-index layer. Thus, a laminate in which the substrate and the AR layer having a four-layer structure were disposed was obtained. This laminate was used as a translucent structure in Case 2.

[Case 3]
(Pretreatment of Substrate)

The same substrate as that in Case 1 was prepared, and performed was pretreatment for cleansing the surface thereof with an aqueous sodium hydrogencarbonate solution, rinsing the surface with ion exchanged water and drying the surface.

(Electrostatic Coating Apparatus)

An electrostatic coating apparatus (Liquid Electrostatic Coater, manufactured by Asahi Sanac Corporation) having a similar configuration as the electrostatic coating apparatus 10 shown in FIG. 5 was prepared. A rotary atomizing automatic electrostatic gun (Sun Bell ESA120, manufactured by Asahi Sanac Corporation, cup diameter of 70 mm) was prepared as each electrostatic coating gun.

A metal mesh tray was prepared as an electrically conductive substrate in order to make it easy to ground the substrate.

(Electrostatic Coating)

Inside a coating booth of the electrostatic coating apparatus, the temperature was adjusted within a range of 25±1° C. and the humidity was adjusted within a range of 50%±10%.

The substrate subjected to pretreatment and heated to 30° C.±3° C. in advance was placed on a chain conveyor of the electrostatic coating apparatus through the electrically conductive substrate. While the substrate was conveyed at an equal velocity by the chain conveyor, the coating liquid (C) at a temperature within a range of 25±1° C. was applied to a T surface (a surface on the opposite side to a surface in contact with molten tin at the time of manufacturing by a float process) of the substrate by an electrostatic coating method on the coating conditions shown in Table 1 (coating liquid rate, cup rotation frequency, nozzle height, cup diameter, voltage, and number of times of coating), and firing was then performed at 450° C. in the atmosphere for 30 minutes to form a base layer. Thus, a laminate in which the substrate and the base layer were disposed was obtained. Chemically strengthening treatment at 410° C. for 2.5 hours using $KNO_3$ molten salt was performed on the laminate. The laminate was used as a translucent structure in Case 3.

[Case 4]

A laminate in which a substrate and a base layer were disposed was obtained in the same manner as in Case 3.

Chemically strengthening treatment at 410° C. for 2.5 hours using $KNO_3$ molten salt was performed on the laminate. Next, performed was pretreatment for cleansing the surface of the base layer with a neutral detergent, washing the surface with pure water, and drying the surface.

Next, the laminate subjected to the pretreatment was set in a substrate holder of a thin film forming apparatus, and an AR layer was formed on the base layer in the same manner as in Case 2. Thus, a laminate in which the substrate, the base layer and the AR layer having a four-layer structure were disposed was obtained. This laminate was used as a translucent structure in Case 4.

[Case 5]

A laminate in which a substrate and a base layer were disposed was obtained in the same manner as in Case 3.

Chemically strengthening treatment and pretreatment were performed on the laminate in the same manner as in Case 4.

(Forming AR Layer by Vapor Deposition Method)

Next, the laminate subjected to the pretreatment was set in a substrate holder of a thin film forming apparatus.

Evacuation was performed, and the substrate was kept in a heated state at a set temperature of about 200° C. While introducing argon gas and oxygen gas into the thin film forming apparatus, $Ta_2O_5$ for a high-refractive-index layer as a first layer was then formed with a film thickness of about 14 nm under a pressure of about 0.03 Pa by electron beam vapor deposition. On this occasion, Ar gas and $O_2$ gas were supplied to an ion source attached to the film forming apparatus, and a voltage of 1,000V and a current of 1,000 mA were applied thereto, to perform film formation while assisting argon ions and oxygen ions onto the substrate. Subsequent film formation for second to fourth layers was performed while assisting argon ions and oxygen ions onto the substrate in the same manner.

Next, $SiO_2$ for a low-refractive-index layer as the second layer was formed with a film thickness of about 33 nm under a pressure of about 0.03 Pa by electron beam vapor deposition. After that, in the same manner as in the first layer, $Ta_2O_5$ for a high-refractive-index layer as the third layer was formed with a film thickness of about 121 nm. Next, in the same manner in the second layer, $SiO_2$ for a low-refractive-index layer as the fourth layer was formed with a film thickness of about 81 nm. Thus, a deposited AR layer was obtained. In this manner, a laminate in which the substrate, the base layer and the AR layer having a four-layer structure were disposed was obtained.

Here, vapor deposition was performed using an electron beam and in a system of assisting ions. However, another system based on resistive heating vapor deposition or the like or another vapor deposition system based on ion plating or the like may be used. In addition, here, the substrate was heated at the set temperature of about 200° C. However, the substrate may be heated at a low temperature of about 100° C., or does not have to be heated. From the viewpoint of adhesiveness of a film, it is preferable that the substrate is heated at a set temperature of about 150 to 200° C. in advance.

[Cases 6, 8, 11 and 14]

A laminate in which a substrate and a base layer were disposed was obtained in the same manner as in Case 3, except that a coating liquid and coating conditions used for electrostatic coating were set as shown in Table 1. Chemically strengthening treatment at 410° C. for 2.5 hours using $KNO_3$ molten salt was performed on the obtained laminate. Laminates obtained thus were used as translucent structures in Cases 6, 8, 11 and 14 respectively.

[Case 7]

A laminate in which a substrate and a base layer were disposed was obtained in the same manner as in Case 6.

Chemically strengthening treatment and pretreatment were performed on the laminate in the same manner as in Case 4. Next the laminate subjected to the pretreatment was set in a substrate holder of a thin film forming apparatus, and an AR layer was formed on the base layer in the same manner as in Case 2. Thus, a laminate in which the substrate, the base layer and the AR layer having a four-layer structure were disposed was obtained. The laminate was used as a translucent structure in Case 7.

[Case 9]

A laminate in which a substrate and a base layer were disposed was obtained in the same manner as in Case 8.

Chemically strengthening treatment and pretreatment were performed on the laminate in the same manner as in Case 4.

The laminate subjected to the pretreatment was set in a substrate holder of a thin film forming apparatus, and an AR layer was formed on the base layer in the same manner as in Case 2. Thus, a laminate in which the substrate, the base layer and the AR layer having a four-layer structure were disposed was obtained. The laminate was used as a translucent structure in Case 9.

[Case 10]

Chemically strengthening treatment at 410° C. for 2.5 hours using $KNO_3$ molten salt was performed on a laminate in which a substrate and a base layer were disposed, in the same manner as in Case 9. Thus, a laminate in which the substrate, the base layer and the AR layer having a four-layer structure were disposed was obtained.

(Forming AFP Layer)

Next, the laminate was extracted from the thin film forming apparatus, and the surface of the AR layer was cleaned by a corona treatment apparatus. After that, a fluorine-based oil repellent agent (tradename "Afluid (registered trademark) S-550", manufactured by Asahi Glass Co., Ltd.) was sprayed to form a film by a spray coating apparatus, so as to form an AFP layer having a thickness of about 7 nm on a low-refractive-index layer in the outermost surface. After the formation of the AFP layer, thermal treatment was performed in the atmosphere at 120° C. for 20 minutes. Thus, a laminate in which the substrate, the base layer, the AR layer having a four-layer structure, and the AFP layer were disposed was obtained. The laminate was used as a translucent structure in Case 10.

Although the tradename "Afluid (registered trademark) S-550" manufactured by Asahi Glass Co., Ltd. was used in this example, the example is not limited to this product and this material. OPTOOL DSX manufactured by Daikin Industries Ltd., or the like, may be used.

[Case 12]

A laminate in which a substrate and a base layer were disposed was obtained in the same manner as in Case 11.

Chemically strengthening treatment and pretreatment were performed on the laminate in the same manner as in Case 4.

Next, the laminate subjected to the pretreatment was set in a substrate holder of a thin film forming apparatus, and an AR layer was formed on the base layer in the same manner as in Case 2. Thus, a laminate in which the substrate, the base layer and the AR layer having a four-layer structure were disposed was obtained. The laminate was used as a translucent structure in Case 12.

[Case 13]

A laminate in which a substrate and a base layer were disposed was obtained in the same manner as in Case 11.

Chemically strengthening treatment and pretreatment were performed on the laminate in the same manner as in Case 4.

(Forming AR Layer by Sputtering Method)

The laminate subjected to the pretreatment was set in a substrate holder of a thin film forming apparatus.

While introducing argon gas and oxygen gas into the thin film forming apparatus to set partial pressure of the argon gas at 0.3 Pa and set partial pressure of the oxygen gas at 0.3 Pa, sputtering was performed using an Nb target with a supplying power of 10 kW, to form a high-refractive-index layer having a thickness of about 13 nm and a refractive index (n) of 2.36 on the substrate. Next, while introducing argon gas and oxygen gas to set partial pressure of the argon gas at 0.29 Pa and set partial pressure of the oxygen gas at 0.27 Pa, sputtering was performed using an Si target with a supplying power of 10 kW, to form a low-refractive-index layer having a thickness of about 38 nm and a refractive index (n) of 1.47 on the aforementioned high-refractive-index layer.

After that, a high-refractive-index layer having a thickness of about 44 nm, a low-refractive-index layer having a thickness of about 19 nm, a high-refractive-index layer having a thickness of about 37 nm, and a low-refractive-index layer having a thickness of about 97 nm were formed sequentially on the aforementioned low-refractive-index layer by the same forming methods and using the same materials as the aforementioned high-refractive-index layer and the aforementioned low-refractive-index layer. Thus, a laminate in which the substrate, the base layer and the AR layer having a six-layer structure were disposed was obtained. This laminate was used as a translucent structure in Case 13.

[Case 15]

9.6 g of the hollow $SiO_2$ fine particle dispersion (H) and 8.0 g of the matrix precursor solution (I) were added to 82.4 g of ethanol which was being stirred. Thus, an upper layer coating liquid having a solid concentration of 2.0 mass % was prepared.

In addition, the upper layer coating solution was applied to a surface of a glass sheet (refractive index ns: 1.53) on the same conditions as upper layer forming conditions which will be described later, and fired to form a single-layer film. The refractive index and the film thickness of the single-layer film were obtained. As a result, the refractive index of the single-layer film was 1.24, and the film thickness thereof was 108 nm.

A laminate in which a substrate and a base layer were disposed was obtained in the same manner as in Case 14.

The laminate was preheated in a preheating furnace, and the aforementioned upper layer coating liquid was then applied onto the base layer by spin coating (500 rpm, 20 seconds). After that, firing was performed at 650° C. for 10 minutes to form an AR layer. Thus, a laminate in which the substrate, the base layer and the AR layer were disposed was obtained. The laminate was used as a translucent structure in Case 15.

The aforementioned evaluations were performed on the obtained translucent structures. Results are shown in Table 2.

Figure 14:
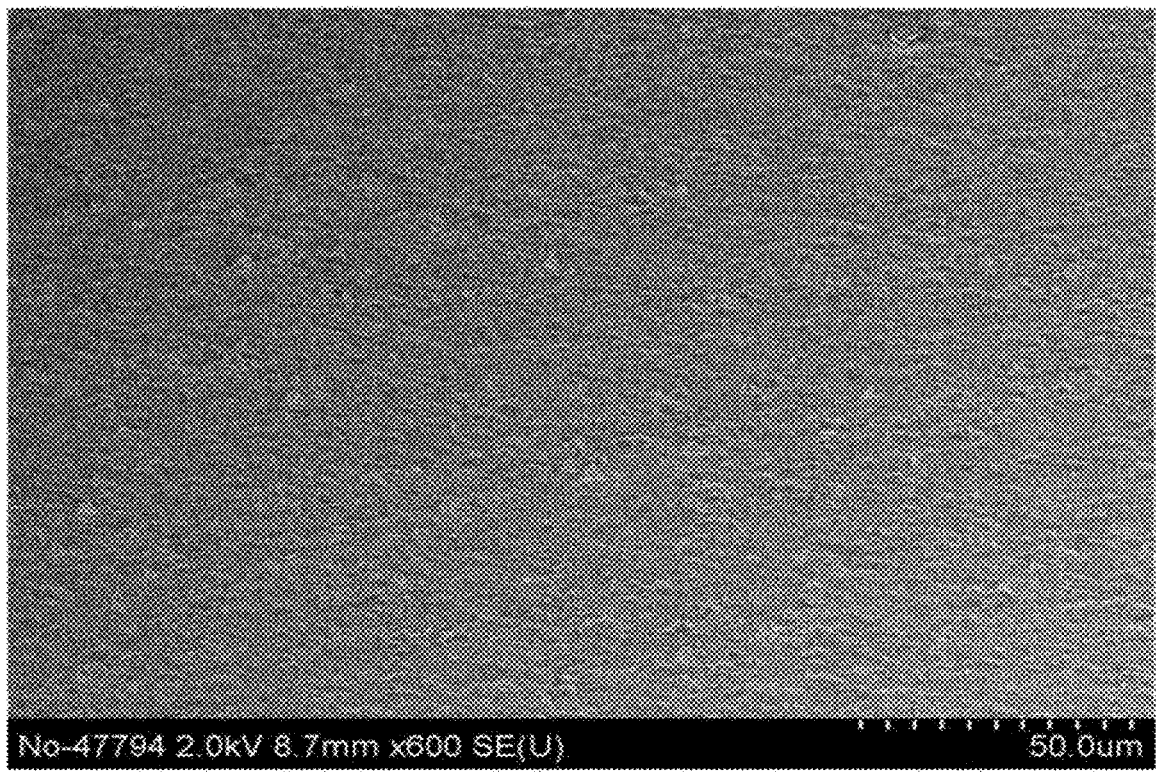
FIG. 14 shows a scanning electron microscopic (SEM) image in which a visible-side outermost surface of a translucent structure obtained in Case 8 of Examples was observed from an obliquely upper direction of an angle of 60 degrees.
Figure 15:
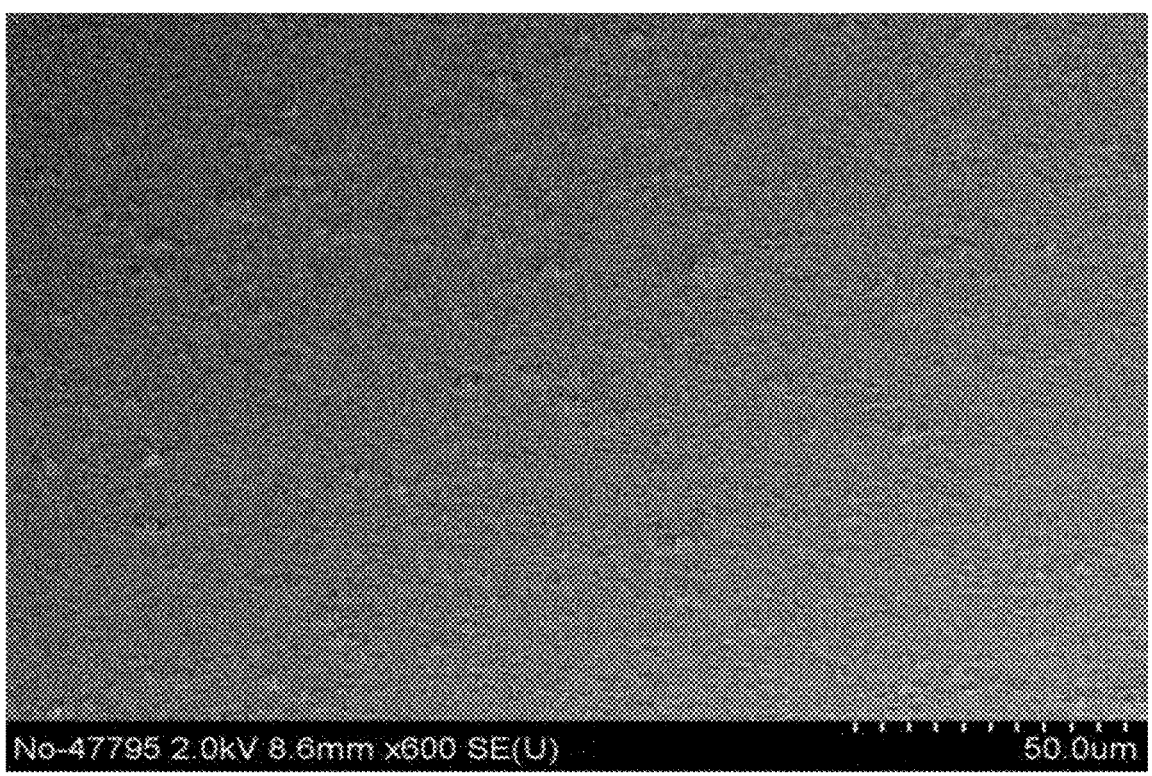
FIG. 15 shows a scanning electron microscopic (SEM) image in which a visible-side outermost surface of a translucent structure obtained in Case 9 of Examples was observed from an obliquely upper direction of an angle of 60 degrees.
Figure 16:
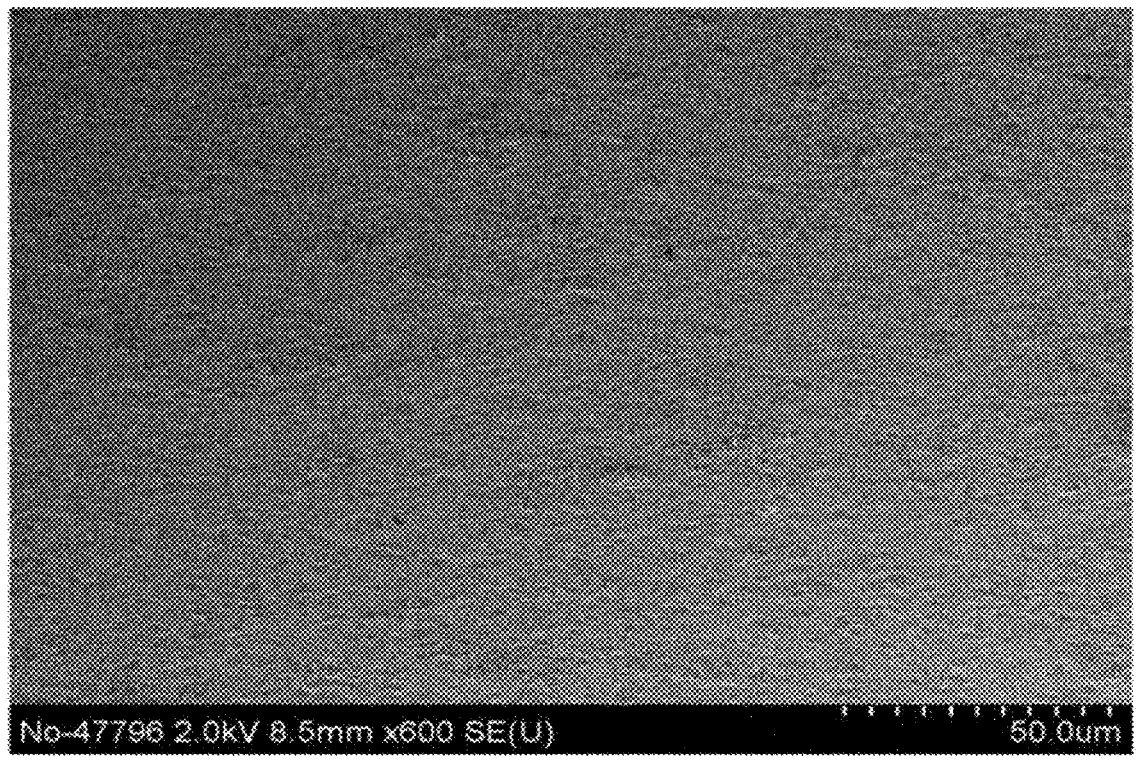
FIG. 16 shows a scanning electron microscopic (SEM) image in which a visible-side outermost surface of a translucent structure obtained in Case 10 of Examples was observed from an obliquely upper direction of an angle of 60 degrees.

FIG. 14 to FIG. 16 show SEM images in which visible-side outermost surfaces of the translucent structures obtained in Cases 8 to 10 were observed from an obliquely upper direction of an angle of 60 degrees, respectively. The SEM images were taken in a magnification of 600 times by use of a scanning electron microscope S-3400N manufactured by Hitachi High-Tech Fielding Corporation.

TABLE 1

| | | Base layer | | | | | | | |
|---|---|---|---|---|---|---|---|---|---|
| | | Coating liquid | | Coating conditions | | | | | |
| | | | | Coating | Cup | | | Number of | |
| | Layer configuration of translucent structure | Kind | Liquid viscosity (mPa·s) | liquid rate (mL/min) | rotation frequency (krpm) | Nozzle height (mm) | Cup diameter (mm) | Voltage (kV) | times of coating (times) | Method for forming AR layer |
| Case 1 | substrate | — | — | — | — | — | — | — | — | — |
| Case 2 | substrate/AR | — | — | — | — | — | — | — | — | Sputtering |
| Case 3 | substrate/base | C | 1.3 | 25 | 25 | 250 | 70 | 60 | 4 | — |
| Case 4 | substrate/base/4-layer AR | C | 1.3 | 25 | 25 | 250 | 70 | 60 | 4 | Sputtering |
| Case 5 | substrate/base/4-layer AR | C | 1.3 | 25 | 25 | 250 | 70 | 60 | 4 | Vapor deposition |
| Case 6 | substrate/base | E | 1.3 | 25 | 35 | 250 | 70 | 60 | 6 | — |
| Case 7 | substrate/base/4-layer AR | E | 1.3 | 25 | 35 | 250 | 70 | 60 | 6 | Sputtering |
| Case 8 | substrate/base | F | 1.3 | 25 | 35 | 250 | 70 | 60 | 6 | — |
| Case 9 | substrate/base/4-layer AR | F | 1.3 | 25 | 35 | 250 | 70 | 60 | 6 | Sputtering |
| Case 10 | substrate/base/4-layer AR/AFP | F | 1.3 | 25 | 35 | 250 | 70 | 60 | 6 | Sputtering |
| Case 11 | substrate/base | G | 1.3 | 50 | 35 | 250 | 70 | 60 | 3 | — |
| Case 12 | substrate/base/4-layer AR | G | 1.3 | 50 | 35 | 250 | 70 | 60 | 3 | Sputtering |
| Case 13 | substrate/base/6-layer AR | G | 1.3 | 50 | 35 | 250 | 70 | 60 | 3 | Sputtering |
| Case 14 | substrate/base | F | 1.3 | 25 | 35 | 250 | 70 | 60 | 6 | — |
| Case 15 | substrate/base/AR | F | 1.3 | 25 | 35 | 250 | 70 | 60 | 6 | Spin coating |

TABLE 2

| | First convex portion | | Second convex portion | | | | | | 60° Relative-specular glossiness (%) | Sparkle index value S | Reflectivity Y (SCI) (%) | Slidability with fingers |
|---|---|---|---|---|---|---|---|---|---|---|---|---|
| | Maximum height P to V (μm) | Average diameter (μm) | Average diameter (μm) | Minimum diameter (μm) | Maximum diameter (μm) | Density (pieces/μm²) | Average height (μm) | Haze (%) | | | | |
| Case 1 | 0.00 | 0.00 | 0.000 | 0.000 | 0.000 | 0 | 0 | 0.1 | 147.7 | 14.7 | 4.5 | B |
| Case 2 | 0.00 | 0.000 | 0.000 | 0.000 | 0.000 | 0 | 0 | 0.1 | 118.5 | 14.6 | 0.5 | B |
| Case 3 | 1.03 | 42.385 | 0.000 | 0.000 | 0.000 | 0 | 0 | 0.2 | 135.5 | 51.2 | 4.1 | B |
| Case 4 | 1.36 | 12.108 | 2.575 | 1.522 | 3.148 | 0.00019 | 0.807 | 0.4 | 112.5 | 56.6 | 1.2 | B |
| Case 5 | 2.14 | 38.620 | 9.161 | 1.131 | 47.255 | 0.001961 | 1.007 | 0.3 | 117.4 | 62.0 | 1.2 | B |
| Case 6 | 1.15 | 22.415 | 1.706 | 1.030 | 4.822 | 0.000823 | 0.648 | 15.0 | 43.4 | 92.0 | 3.7 | B |
| Case 7 | 1.65 | 136.324 | 2.874 | 1.021 | 12.739 | 0.005568 | 0.825 | 15.6 | 37.6 | 86.9 | 0.6 | B |
| Case 8 | 2.03 | 134.821 | 2.476 | 1.011 | 7.130 | 0.006770 | 1.176 | 31.7 | 32.9 | 45.6 | 3.5 | B |
| Case 9 | 1.77 | 12.353 | 1.984 | 1.027 | 4.883 | 0.003037 | 1.425 | 30.8 | 26.3 | 56.1 | 0.7 | B |
| Case 10 | 3.43 | 15.860 | 1.751 | 1.022 | 4.714 | 0.002278 | 1.501 | 33.5 | 22.0 | 56.4 | 1.3 | A |
| Case 11 | 3.30 | 11.361 | 3.452 | 1.060 | 8.591 | 0.006707 | 1.960 | 42.7 | 16.9 | 75.0 | 3.8 | B |
| Case 12 | 3.02 | 132.055 | 3.326 | 1.019 | 9.908 | 0.005378 | 1.818 | 48.1 | 13.6 | 49.2 | 0.9 | B |
| Case 13 | 3.85 | 19.105 | 2.368 | 1.020 | 7.325 | 0.006517 | 1.476 | 40.7 | 13.95 | 47.3 | 1.0 | B |
| Case 14 | 2.58 | 15.303 | 2.219 | 1.022 | 5.473 | 0.002468 | 1.321 | 27.4 | 37.5 | 49.9 | 3.45 | B |
| Case 15 | 3.03 | 36.487 | 2.382 | 1.030 | 5.934 | 0.004998 | 1.333 | 22.2 | 34.8 | 55.6 | 2.33 | B |

As shown in the aforementioned results, in each of the translucent structures in Cases 4 to 5, 7, 9 to 10, 12 to 13, and 15, the Y value was 3% or less, and an excellent antireflection property was provided. In addition, the haze was 0.3% or more, and an antiglare property was provided. The antiglare property was excellent particularly in Cases 7, 9 to 10, 12 to 13, and 15. In addition, the sparkle index S was less than 10, and sparkle was suppressed sufficiently for practical use. The slidability with fingers was also excellent in the translucent structure in Case 10 in which the AFP layer was provided in the outermost surface layer.

On the other hand, the Y value was highest in the translucent structure in Case 1 in which there was no AR layer and there was no concave and convex structure in the outermost surface. In the translucent structure in Case 2 in which there was no concave and convex structure in the outermost surface though the AR layer was provided, the haze was small, and the antiglare property was inferior. In the translucent structure in Case 3 in which there was no AR layer and the concave and convex structure in the outermost surface did not include the second convex portions, the antiglare property and the antireflection property were inferior. In the translucent structure in each of Cases 6, 8, 11 and 14 in which there was no AR layer, the antireflection property was inferior.

The present application is based on Japanese Patent Application No. 2015-170874 filed on Aug. 31, 2015, the contents of which are incorporated herein by reference.

INDUSTRIAL APPLICABILITY

In a translucent structure in the present invention, an AR layer is provided on a visible side of a translucent substrate, and a concave and convex structure which includes first convex portions and second convex portions and in which the number of the second convex portions is 0.0001 to 1.2 per 1 μm² is provided in the visible-side outermost surface. Accordingly, the translucent structure is excellent in antiglare property and antireflection property, and sparkle is suppressed sufficiently.

Therefore, when the translucent structure in the present invention is, for example, disposed on a display surface of an image display device, reflection of external light itself can be suppressed to suppress reduction in visibility of an image caused by the external light reflected in the display surface. In addition, the external light is diffused and reflected by the concave and convex structure in the outermost surface to thereby make a reflected image unclear. Also from this point, it is possible to suppress reduction in visibility of an image caused by the external light reflected in the display surface. Further, sparkle hardly occurs in the surface of the concave and convex structure. It is therefore possible to suppress reduction in visibility of an image caused by the sparkle.

The translucent structure in the present invention can be used for various applications described previously. Particularly the translucent structure in the present invention can be used favorably for interior components of transport machines and particularly on-vehicle articles because an antiglare property, an antireflection property and a low sparkle property can be attained at a high level.

DESCRIPTION OF REFERENCE NUMERALS AND SIGNS 1,2,6 Translucent structure
3,4 Translucent substrate
5 Base layer
7 Antireflection (AR) layer
8 Translucent structure
9 Water-repellent and oil-repellent (AFP) layer
4a,5a,7a,9a First convex portion
4b,5b,7b,9b Second convex portion
10 Electrostatic coating apparatus
11 Coating booth
12 Chain conveyor
13 High voltage cable
14 Supply line for supplying coating composition
15 Recovery line for recovering coating composition
16a,16b Supply line for supplying air
17 Electrostatic coating gun
18 High voltage generating device
19 Exhaust duct
20 Exhaust box
21 Electrically conductive substrate
30 Gun body
31 Coating material supply pipe
32 Rotary shaft
33 Outlet
35 Air supply channel
40 Rotary atomizing head
41 First part
42 Second part
43 Shaft mounting portion
44 Retention portion
45 Peripheral wall
46 Guide surface
47 Diameter expansion portion
48 Diffusion surface
49 Front wall
50 Overflow hole
51 Cylindrical portion
52 Rear wall
53 Through hole
S Storage chamber

The invention claimed is:

1. A translucent structure comprising a translucent substrate and an antireflection layer provided on a visible side of the translucent substrate so that reflectivity of the translucent structure based on an SCI method is 3% or less,
    wherein a visible-side outermost surface of the translucent structure includes a concave and convex structure as follows:
    the concave and convex structure includes a first convex portion and a second convex portion, the first convex portion having a diameter exceeding 10 μm in a section at a height of 0.05 μm from a bearing height in a surface shape obtained by measuring a region of (101 μm×135 μm) to (111 μm×148 μm) by a laser microscope, and the second convex portion having a diameter exceeding 1 μm in a section at a height of 0.5 μm from the bearing height in the surface shape;
    an average diameter of the first convex portion in the section at the height of 0.05 μm from the bearing height in the surface shape is more than 10 μm and 185 μm or less;
    a maximum height of the first convex portion with reference to a height of a lowest part within the region is 0.2 to 8 μm; and
    the number density of the second convex portion is 0.0001 to 1.2 per 1 μm², and an average height of the second convex portion is 0.1 to 8 μm based on the bearing height,
    wherein the diameter of the first convex portion in a cross section is a diameter of an exact circle which has the same area as the first convex portion in the cross section, and the diameter of the second convex portion in a cross section is a diameter of an exact circle which has the same area as the second convex portion in the cross section.

2. The translucent structure according to claim 1, wherein the antireflection layer is located on the outermost visible side of the translucent structure.

3. The translucent structure according to claim 2, further comprising a base layer between the translucent substrate and the antireflection layer,
    wherein a surface of the base layer on the antireflection layer side includes the concave and convex structure.

4. The translucent structure according to claim 2, wherein a visible-side surface of the translucent substrate includes the concave and convex structure.

5. The translucent structure according to claim 2, wherein the translucent substrate is a glass sheet.

6. The translucent structure according to claim 1, further comprising a water-repellent and oil-repellent layer,
    wherein the water-repellent and oil-repellent layer is located on the outermost visible side of the translucent structure, and the antireflection layer is located just under the water-repellent and oil-repellent layer.

7. The translucent structure according to claim 6, further comprising a base layer between the translucent substrate and the antireflection layer,
    wherein a surface of the base layer on the antireflection layer side includes the concave and convex structure.

8. The translucent structure according to claim 6, wherein a visible-side surface of the translucent substrate includes the concave and convex structure.

9. The translucent structure according to claim 6, wherein the translucent substrate is a glass sheet.

10. The translucent structure according to claim 1, further comprising a base layer between the translucent substrate and the antireflection layer,
wherein a surface of the base layer on the antireflection layer side includes the concave and convex structure.

11. A method for manufacturing the translucent structure according to claim 10, the method comprising:
applying a coating composition onto the translucent substrate to form a coating film, and firing the coating film to thereby form the base layer; and
forming the antireflection layer on the base layer; wherein:
the coating composition contains at least one of a silica precursor (A) and a particle (C), and a liquid medium (B), and the liquid medium (B) contains 86 mass % or more of a liquid medium (B1) relative to a total quantity of the liquid medium (B), the liquid medium (B1) having a boiling point of 150° C. or less; and
the coating composition is applied by charging and spraying the coating composition with an electrostatic coating apparatus including an electrostatic coating gun including a rotary atomizing head.

12. The method for manufacturing the translucent structure according to claim 11, wherein viscosity of the coating composition at a coating temperature is 0.003 Pa·s or less.

13. The translucent structure according to claim 10, wherein the translucent substrate is a glass sheet.

14. The translucent structure according to claim 1, wherein a visible-side surface of the translucent substrate includes the concave and convex structure.

15. The translucent structure according to claim 14, wherein the translucent substrate is a glass sheet.

16. The translucent structure according to claim 1, wherein the translucent substrate is a glass sheet.

17. The translucent structure according to claim 1, wherein the translucent substrate has a curved surface.

18. The translucent structure according to claim 1, which has a haze of more than 10% and 70% or less.

19. The translucent structure according to claim 1, which is for use in an on-vehicle article.

20. An article comprising the translucent structure according to claim 1.

* * * * *